(12) United States Patent
Yokoyama et al.

(10) Patent No.: US 9,897,354 B2
(45) Date of Patent: Feb. 20, 2018

(54) EJECTOR

(71) Applicant: DENSO CORPORATION, Kariya, Aichi-pref. (JP)

(72) Inventors: Yoshiyuki Yokoyama, Kariya (JP); Etsuhisa Yamada, Kariya (JP); Haruyuki Nishijima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 91 days.

(21) Appl. No.: 14/908,010

(22) PCT Filed: Jul. 22, 2014

(86) PCT No.: PCT/JP2014/003836
§ 371 (c)(1),
(2) Date: Jan. 27, 2016

(87) PCT Pub. No.: WO2015/015752
PCT Pub. Date: Feb. 5, 2015

(65) Prior Publication Data
US 2016/0169565 A1    Jun. 16, 2016

(30) Foreign Application Priority Data

Jul. 30, 2013   (JP) .................... 2013-157580

(51) Int. Cl.
| F25B 1/06 | (2006.01) |
| F25B 41/00 | (2006.01) |
| F04F 5/10 | (2006.01) |
| F25B 41/06 | (2006.01) |
| F04F 5/46 | (2006.01) |

(Continued)

(52) U.S. Cl.
CPC ............... *F25B 41/00* (2013.01); *F04F 5/10* (2013.01); *F04F 5/44* (2013.01); *F04F 5/463* (2013.01);

(Continued)

(58) Field of Classification Search
CPC .......... F25B 2341/012; F25B 2341/001; F25B 2341/0011; F25B 2341/0016; F25B 9/08; F25B 41/062; F04F 5/20
See application file for complete search history.

(56) References Cited

U.S. PATENT DOCUMENTS

| 2001/0025499 A1 | 10/2001 | Takeuchi et al. |
| 2002/0000095 A1 | 1/2002 | Takeuchi et al. |

(Continued)

FOREIGN PATENT DOCUMENTS

| JP | S432670 B1 | 1/1968 |
| JP | S6176800 A | 4/1986 |

(Continued)

OTHER PUBLICATIONS

International Search Report and Written Opinion (in Japanese with English Translation) for PCT/JP2014/003836, dated Sep. 30, 2014; ISA/JP.

*Primary Examiner* — Elizabeth Martin
(74) *Attorney, Agent, or Firm* — Harness, Dickey & Pierce, P.L.C.

(57) ABSTRACT

In an ejector, a passage formation member is disposed inside a body forming a space therein. Provided between an inner peripheral surface of the body and the passage formation member are a nozzle passage functioning as a nozzle, a mixing passage in which an ejection refrigerant ejected from the nozzle passage and a suction refrigerant drawn through a suction passage are mixed together, and a diffuser passage that converts a kinetic energy of the refrigerant that has flowed out of the mixing passage into a pressure energy. The mixing passage has a shape gradually reducing in cross-sectional area toward a downstream side in the refrigerant flow.

3 Claims, 11 Drawing Sheets

(51) Int. Cl.
  *F04F 5/44* (2006.01)
  *F25B 9/08* (2006.01)
  *F25B 5/02* (2006.01)
  *F25B 6/02* (2006.01)
  *F25B 40/02* (2006.01)
  *B60H 1/32* (2006.01)

(52) U.S. Cl.
  CPC .............. *F25B 9/08* (2013.01); *F25B 41/062* (2013.01); *B60H 2001/3298* (2013.01); *F25B 5/02* (2013.01); *F25B 6/02* (2013.01); *F25B 40/02* (2013.01); *F25B 2327/001* (2013.01); *F25B 2341/0012* (2013.01); *F25B 2400/0407* (2013.01); *F25B 2400/23* (2013.01); *F25B 2500/18* (2013.01)

(56) References Cited

U.S. PATENT DOCUMENTS

| | | |
|---|---|---|
| 2002/0184903 A1 | 12/2002 | Takeuchi et al. |
| 2009/0232665 A1* | 9/2009 | Gocho .................. F04F 5/04 417/151 |
| 2012/0247146 A1 | 10/2012 | Yamada et al. |
| 2014/0020424 A1 | 1/2014 | Suzuki et al. |
| 2015/0033790 A1 | 2/2015 | Yamada et al. |
| 2015/0345840 A1 | 12/2015 | Yokoyama et al. |

FOREIGN PATENT DOCUMENTS

| | | |
|---|---|---|
| JP | H01250000 A | 10/1989 |
| JP | 2001200800 A | 7/2001 |
| JP | 3322263 B1 | 9/2002 |
| JP | 3331604 B2 | 10/2002 |
| JP | 2003014318 A | 1/2003 |
| JP | 2008202812 A | 9/2008 |
| JP | 2008232458 A | 10/2008 |
| JP | 2009133624 A | 6/2009 |
| JP | 2010116927 A | 5/2010 |
| JP | 2010210111 A | 9/2010 |
| JP | 2012202652 A | 10/2012 |
| JP | 2012202653 A | 10/2012 |
| JP | 2013177879 A | 9/2013 |
| WO | WO-2014103276 A1 | 7/2014 |

* cited by examiner

EJECTOR

CROSS REFERENCE TO RELATED APPLICATIONS

This application is a U.S. National Phase Application under 35 U.S.C. 371 of International Application No. PCT/JP2014/003836 filed on Jul. 22, 2014 and published in Japanese as WO 2015/015752 A1 on Feb. 5, 2015. This application is based on and claims the benefit of priority from Japanese Patent Application No. 2013-157580 filed on Jul. 30, 2013. The entire disclosures of all of the above applications are incorporated herein by reference.

TECHNICAL FIELD

The present disclosure relates to an ejector that depressurizes a fluid, and draws the fluid by a suction action of an ejection fluid ejected at high speed.

BACKGROUND ART

Up to now, ejectors have been known as a depressurizing device applied to a vapor compression refrigeration cycle device. The ejector of this type has a nozzle portion that depressurizes refrigerant, draws a gas-phase refrigerant which has flowed out of an evaporator due to a suction action of an ejection refrigerant ejected from the nozzle portion, mixes the ejection refrigerant with the suction refrigerant in a pressure increase part (diffuser portion), thereby being capable of increasing the pressure.

Accordingly, in a refrigeration cycle device (hereinafter, referred to as an ejector refrigeration cycle) including an ejector as a depressurizing device, power consumption of a compressor can be decreased using refrigerant pressure action in the pressure increase part of an ejector, and a coefficient of performance (COP) of a cycle can be further improved to a greater extent than a general refrigeration cycle device including an expansion valve or the like as a depressurizing device.

Further, Patent Document 1 discloses an ejector having the nozzle portion which depressurizes the refrigerant in two stages as the ejector applied to the ejector refrigeration cycle. In more detail, in the ejector of Patent Document 1, the refrigerant of a high pressure liquid-phase state is depressurized into a gas-liquid two-phase state in a first nozzle, and the refrigerant that has been the gas-liquid two-phase state flows into a second nozzle.

With the above configuration, in the ejector of Patent Document 1, boiling of the refrigerant in the second nozzle is promoted to improve a nozzle efficiency as the overall nozzle portion, and the COP is to be further improved as the overall ejector refrigeration cycle.

In the general ejector, a diffuser portion (pressure increase part) is coaxially arranged on an extension in an axial direction of the nozzle portion. In addition, Patent Document 2 discloses that a spread angle of the diffuser portion thus arranged is relatively reduced to enable an improvement in the ejector efficiency.

The nozzle efficiency means energy conversion efficiency when a pressure energy of the refrigerant is converted into a kinetic energy in the nozzle portion. The ejector efficiency means energy conversion efficiency as the overall ejector.

However, in the ejector of Patent Document 1, for example, a heat load of the ejector refrigeration cycle becomes low, and a pressure difference (a difference between a high pressure and a low pressure) between the pressure of a high-pressure side refrigerant and the pressure of a low-pressure side refrigerant in the cycle is reduced. As a result, the difference between the high pressure and the low pressure is depressurized by the first nozzle, and most of the refrigerant may not be depressurized in the second nozzle.

In this case, the nozzle efficiency by causing the gas-liquid two phase refrigerant to flow in the second nozzle is not improved. As a result, the refrigerant may not be sufficiently pressurized by the diffuser portion.

On the contrary, with the application of the diffuser portion having the relatively small spread angle disclosed in Patent Document 2 to the ejector of Patent Document 1 to improve the ejector efficiency, a method of pressurizing the refrigerant sufficiently in the diffuser portion even in the low load of the ejector refrigeration cycle is conceivable.

However, when the diffuser portion is applied, the length in the axial direction of the nozzle portion in the entire ejector increases, and thereby causes the possibility that a volume of the ejector may unnecessarily increase during a general load of the ejector refrigeration cycle.

PRIOR ART DOCUMENT

Patent Document

Patent Document 1: JP 3331604
Patent Document 2: JP 2003-14318 A

SUMMARY OF THE INVENTION

The present disclosure has been made in view of the above circumstances, and one object of the present disclosure is to provide an ejector which is capable of restricting a body size of an overall ejector from being upsized.

Another object of the present disclosure is to restrict a reduction in ejector efficiency in an ejector in which a refrigerant passage disposed on a downstream side of another refrigerant passage that functions as a nozzle is defined on an outer peripheral side of a passage formation member.

According to an aspect of the present disclosure, an ejector is used for a vapor compression refrigeration cycle device. The ejector includes: a body including a depressurizing space in which a refrigerant is depressurized, a suction passage that communicates with a downstream side of the depressurizing space in a refrigerant flow and draws a refrigerant from an external, a mixing space in which a refrigerant ejected from the depressurizing space and a refrigerant drawn through the suction passage are merged, and a pressurizing space into which a refrigerant mixed in the mixing space flow; and a passage formation member which is arranged at least in the depressurizing space, the mixing space and the pressurizing space, and has a conical shape that increases in cross-sectional area with distance from the depressurizing space. The depressurizing space has a nozzle passage, which functions as a nozzle that depressurizes and ejects the refrigerant, between an inner peripheral surface of the body and an outer peripheral surface of the passage formation member. The mixing space has a mixing passage, in which the ejection refrigerant and the suction refrigerant are mixed together, between the inner peripheral surface of the body and the outer peripheral surface of the passage formation member. The pressurizing space has a diffuser passage, which functions as a diffuser that converts a kinetic energy of the mixed refrigerant into a pressure energy, between the inner peripheral surface of the body and the outer peripheral surface of the passage formation member. The mixing passage has a shape that is constant or gradually reduces in cross-sectional area toward a downstream side in the refrigerant flow.

According to the above configuration, with the application of the passage formation member formed into a conical shape, the diffuser passage has a shape spreading along an outer periphery of the passage formation member with distance from the depressurizing space. Accordingly, an increase of dimensions in the axial direction of the diffuser passage is limited, and an increase in the volume of the entire ejector can be limited. Since the mixing passage is formed into a shape constant or gradually reduced in the passage cross-sectional area toward a downstream side in the refrigerant flow, mixed refrigerants of the ejection refrigerant and the suction refrigerant flowing into the mixing passage can be accelerated. With the above configuration, the pressure of the mixed refrigerants can be gradually reduced toward an outlet side in the mixing passage.

Further, since the ejection refrigerant and the suction refrigerant flowing into the mixing passage flow toward the outlet side low in pressure, a flow of the ejection refrigerant can be restricted from drifting to an outer peripheral surface side of the passage formation member. In addition, the suction refrigerant can be restricted from flowing from the outer peripheral side of the ejection refrigerant toward the inner peripheral side.

Therefore, droplets (grains of a liquid-phase refrigerant) in the ejection refrigerant can be restricted from adhering to an inner peripheral surface of the body or an outer peripheral surface of the passage formation member, and the droplets in the ejection refrigerant, the gas-phase refrigerant in the ejection refrigerant, and the suction refrigerant can be sufficiently mixed together in the mixing passage. The velocity energy of the droplets in the ejection refrigerant can be effectively transmitted to the gas-phase refrigerant in the mixed refrigerants.

As a result, the kinetic energy of the mixed refrigerants, which is converted into a pressure energy in the diffuser passage, can be restricted from being reduced, and a reduction in the pressure increase amount in the diffuser passage can be limited. Therefore, a reduction in the ejector efficiency can be limited.

In other words, even in the ejector having a configuration in which the mixing passage provided on the downstream side of the nozzle passage is defined on the outer peripheral side of the passage formation member, a reduction in the ejector efficiency can be limited.

According to another aspect of the present disclosure, an ejector is used for a vapor compression refrigeration cycle device. The ejector includes: body including a depressurizing space in which a refrigerant is depressurized, and a first suction passage that communicates with a downstream side of the depressurizing space in a refrigerant flow and draws a refrigerant from an external; and a passage formation member which is arranged at least in the depressurizing space, has a conical shape increasing in cross-sectional area with distance from the depressurizing space, and includes a second suction passage that communicates with the downstream side of the depressurizing space in the refrigerant flow and draws a refrigerant from the external. The body further includes a pressurizing space into which a mixed refrigerant of a refrigerant ejected from the depressurizing space, a first suction refrigerant drawn through the first suction passage and a second suction refrigerant drawn through the second suction passage are mixed together flow. The depressurizing space has a nozzle passage, which functions as a nozzle that depressurizes and ejects the refrigerant, between an inner peripheral surface of the body and an outer peripheral surface of the passage formation member. The pressurizing space has a diffuser passage, which functions as a diffuser that converts a kinetic energy of the mixed refrigerant into a pressure energy, between the inner peripheral surface of the body and the outer peripheral surface of the passage formation member. A refrigerant outlet of the first suction passage is opened on an outer peripheral side of a refrigerant outlet of the nozzle passage. A refrigerant outlet of the second suction passage is opened on an inner peripheral side of the refrigerant outlet of the nozzle passage.

According to the above configuration, with the application of the passage formation member formed into a conical shape, the diffuser passage has a shape spreading along an outer periphery of the passage formation member with distance from the depressurizing space. Accordingly, an increase of dimensions in the axial direction of the diffuser passage is limited, and an increase in the volume of the entire ejector can be limited. The refrigerant outlet of the first suction passage is opened on an outer peripheral side of the refrigerant outlet of the nozzle passage, and the refrigerant outlet of the second suction passage is opened on an inner peripheral side of the refrigerant outlet of the nozzle passage. Therefore, the first suction refrigerant merges into the ejection refrigerant from the outer peripheral side of the ejection refrigerant, and the second suction refrigerant merges into the ejection refrigerant from the inner peripheral side of the ejection refrigerant.

Therefore, a boundary surface between the refrigerant on the outer peripheral side in the ejection refrigerant and the first suction refrigerant, and a boundary surface between the refrigerant on the inner peripheral side in the ejection refrigerant and the second suction refrigerant are each a free interface, and the ejection refrigerant can be restricted from drifting to the outer peripheral side or the inner peripheral side.

Further, the first suction refrigerant flows toward the inner peripheral side from the outer peripheral side of the ejection refrigerant, and the second suction refrigerant flows toward the outer peripheral side from the inner peripheral side of the ejection refrigerant. As a result, the ejection refrigerant, the first suction refrigerant, and the second suction refrigerant can be sufficiently mixed together. Therefore, the velocity energy of the droplets in the ejection refrigerant can be effectively transmitted to the gas-phase refrigerant in the mixed refrigerants.

As a result, a reduction in the ejector efficiency can be limited. In other words, even in the ejector having a configuration in which the mixing passage provided on the downstream side of the nozzle passage is defined on the outer peripheral side of the passage formation member, a reduction in the ejector efficiency can be limited.

The passage formation member is not strictly limited to one having only the shape in which the sectional area increases with distance from the depressurizing space. At least a part of the passage formation member may include a shape expanding outward with distance from the depressurizing space, and the diffuser passage has a shape expanding outward with distance from the depressurizing space according to the shape of the passage formation member.

In addition, the "formed into a conical shape" is not limited to a meaning that the passage formation member is formed into a complete conical shape, but also includes a shape close to cone or a shape partially including the conical shape. Specifically, a sectional shape in an axial direction is not limited to an isosceles triangle, and may include a shape that has two sides in a state where an apex is interposed between two sides that are convex toward the inner peripheral side, a shape that has two sides in a state where an apex is interposed between two sides that are convex toward the outer peripheral side, a shape in which the sectional shape is formed in a semicircular shape, or the like.

EMBODIMENTS FOR EXPLOITATION OF THE INVENTION

Figure 1:
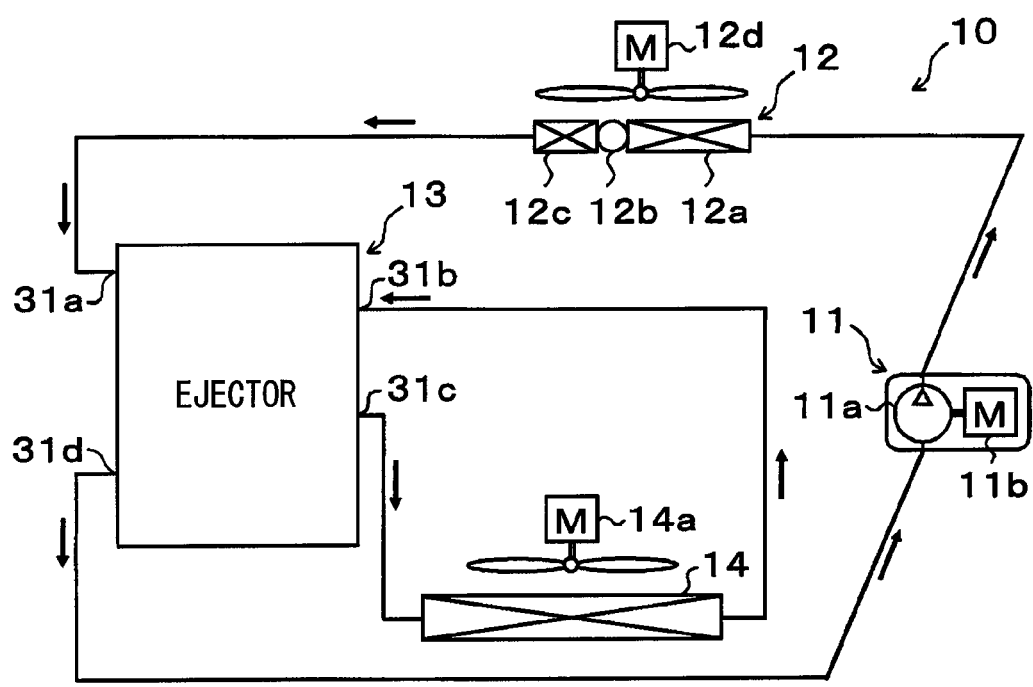
FIG. 1 is a schematic diagram of an ejector refrigeration cycle according to a first embodiment of the present disclosure.

The present inventors have proposed an ejector applied to an ejector refrigeration cycle in Japanese Patent Application No. 2012-184950 (hereinafter referred to as "earlier application example") in advance. The ejector includes a body part having a swirling space in which a refrigerant that has flowed out of a radiator is swirled, a depressurizing space in which the refrigerant that has flowed out of the swirling space is depressurized, a suction passage that communicates with a downstream side of the depressurizing space in a refrigerant flow, and draws the refrigerant that has flowed out of an evaporator, and a pressurizing space in which the ejection refrigerant jetted from the depressurizing space and the suction refrigerant drawn from the suction passage are mixed together and pressurized. The ejector further includes a passage formation member that is at least partially disposed in the interior of the depressurizing space and the interior of the pressurizing space, and formed into a conical shape that increases in cross section with distance from the decompressing space. The depressurizing space has a nozzle passage between the inner peripheral surface of the body and the outer peripheral surface of the passage formation member. The nozzle passage functions as a nozzle that depressurizes the refrigerant that has flowed out of the swirling space, and ejects the refrigerant. The pressurizing space has a diffuser passage between the inner peripheral surface of the body and the outer peripheral surface of the passage formation member. The diffuser passage functions as a diffuser that mixes the ejection refrigerant and the suction refrigerant together, and pressurizes the mixed refrigerants. The refrigerant outlet of the suction passage is opened in an annular shape on the outer peripheral side of the refrigerant outlet (refrigerant ejection port) of the nozzle passage.

In the ejector of the earlier application example, the refrigerant swirls in the swirling space with the results that a refrigerant pressure on a swirling center side within the swirling space can be reduced to a pressure of a saturated liquid-phase refrigerant, or a pressure at which the refrigerant is depressurized and boiled (cavitation occurs). With the above operation, a larger amount of gas-phase refrigerant is present on an inner peripheral side than an outer peripheral side of a swirling center axis. This leads to a two-phase separation state in which the refrigerant has a gas single phase in the vicinity of a swirling center line within the swirling space, and has a liquid single phase around the vicinity thereof.

The refrigerant of the two-phase separation state flows into the nozzle passage, and boiling of the refrigerant is promoted by wall surface boiling and interface boiling. Therefore, the refrigerant puts into a gas-liquid mixed state in which a gas phase and a liquid phase are homogeneously mixed together in the vicinity of a minimum flow channel area portion of the nozzle passage. The refrigerant in a gas-liquid mixed state is sealed (choked) in the vicinity of the minimum flow channel area portion of the nozzle passage, and a flow rate of the refrigerant in a gas-liquid mixed state is accelerated until the flow rate becomes a two-phase sonic speed.

The refrigerant thus accelerated to the two-phase sonic speed becomes an ideal two-phase spray flow in which the two phases are homogeneously mixed together on a downstream side of the minimum flow channel area portion in the nozzle passage, and the flow rate can further increase. As a result, the energy conversion efficiency (corresponding to the nozzle efficiency) in converting a pressure energy of the refrigerant into a velocity energy in the nozzle passage can be improved.

In the ejector of the earlier application example, the member formed in a conical shape is applied as the passage formation member, and the shape of the diffuser passage enlarges along the outer periphery of the passage formation member with distance from the depressurizing space. Accordingly, an increase of dimensions in the axial direction of the diffuser passage is limited, and an increase in the volume of the entire ejector can be limited.

In other words, according to the ejector of the earlier application example, even when a variation in the load of the ejector refrigeration cycle occurs without increasing a body size, a reduction in the energy conversion efficiency (corresponding to nozzle efficiency) in the nozzle passage can be limited.

Meanwhile, in order to further improve the energy conversion efficiency of the ejector, the present inventors have reviewed the ejector of the earlier application example. As a result, in the ejector of the earlier application example, a reduction in the energy conversion efficiency in the nozzle passage can be limited. However, the energy conversion efficiency (ejector efficiency) as the overall ejector may be lower than a desired value.

Under the circumstances, the present inventors have investigated the cause, and found that the cause is a fact that in the ejector of the earlier application example, the refrigerant passage on the downstream side of the nozzle passage is provided on the outer peripheral side of the passage formation member, and the refrigerant outlet of the suction passage is opened on the outer peripheral side of the refrigerant outlet (refrigerant ejection port) of the nozzle passage with respect to the center axis of the passage formation member.

The reason is because in the refrigerant passage configuration of the ejector in the earlier application example, the droplets (grains of the liquid-phase refrigerant) in the ejection refrigerant adhere to the outer peripheral surface of the passage formation member, as a result of which the velocity energy of the droplets in the ejection refrigerant cannot be effectively transmitted to the gas-phase refrigerant (gas-phase refrigerant and the suction refrigerant in the ejection refrigerant) in the mixed refrigerants.

In more detail, since the refrigerant on the outer peripheral side in the ejection refrigerant ejected from the nozzle passage comes into contact with the suction refrigerant drawn from the suction passage, the boundary surface between the refrigerant on the outer peripheral side of the ejection refrigerant and the suction refrigerant becomes a free boundary. On the other hand, since the refrigerant on the inner peripheral side in the ejection refrigerant comes into contact with the outer peripheral surface of the passage formation member, the boundary surface between the refrigerant on the inner peripheral side of the ejection refrigerant and the passage formation member becomes a fixed boundary. For that reason, a flow of the ejection refrigerant is liable to drift to the fixed boundary side where the speed of the refrigerant becomes slow rather than the free boundary side.

Further, when a pressure of the ejection refrigerant is reduced with the acceleration of the droplets in the ejection refrigerant due to an inertia force, the suction refrigerant flows toward the inner peripheral side from the outer peripheral side of the ejection refrigerant toward the ejection refrigerant low in the pressure. As a result, the ejection refrigerant is also liable to flow toward the inner peripheral side (that is, the outer peripheral surface side of the passage formation member).

For that reason, the droplets in the ejection refrigerant adhere to the outer peripheral surface of the passage formation member without being sufficiently mixed with the gas-phase refrigerant in the ejection refrigerant and the suction refrigerant, resulting in a risk that the velocity energy of the droplets cannot be effectively transmitted to the gas-phase refrigerant in the mixed refrigerants. As a result, the pressure increase amount in the diffuser passage may be reduced, and the ejector efficiency may be lowered.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment of the present disclosure will be described with reference to FIGS. 1 to 5. As illustrated in FIG. 1, an ejector 13 of this embodiment is applied to a vapor compression refrigeration cycle device including an ejector as a refrigerant depressurizing device, that is, an ejector refrigeration cycle 10. Moreover, the ejector refrigeration cycle 10 is applied to a vehicle air conditioning apparatus, and performs a function of cooling blast air which is blown into a vehicle interior that is a space to be air-conditioned.

The ejector refrigeration cycle 10 employs an HFC based refrigerant (specifically, R134a) as the refrigerant, and forms a subcritical refrigeration cycle in which a high pressure-side refrigerant pressure does not exceed a critical pressure of the refrigerant. The ejector refrigeration cycle 10 may employ an HFO based refrigerant (specifically, R1234yf) or the like as the refrigerant. Furthermore, refrigerator oil for lubricating a compressor 11 is mixed in the refrigerant, and a part of the refrigerator oil circulates in the cycle together with the refrigerant.

In the ejector refrigeration cycle 10, the compressor 11 draws the refrigerant, increases the pressure of the refrigerant until the refrigerant becomes a high-pressure refrigerant, and discharges the pressurized refrigerant. Specifically, the compressor 11 of this embodiment is an electric compressor that is configured to accommodate a fixed capacity type compression mechanism 11a and an electric motor 11b for driving the compression mechanism 11a in a single housing.

As the compression mechanism 11a, various compression mechanisms such as a scroll compression mechanism or a vane compression mechanism are capable of being adopted. The electric motor 11b controls an operation (rotation speed) of the electric motor according to control signals output from a control device to be described below, and any motor of an AC motor and a DC motor may be applied.

The compressor 11 may be an engine driven compressor that is driven by a rotation driving force transmitted via a pulley, a belt, or the like from a vehicle travel engine. As the engine driven compressor of this type, a variable capacity compressor that can adjust a refrigerant discharge capacity by a change in discharge capacity, or a fixed capacity type compressor that adjusts the refrigerant discharging capacity by changing an operation rate of the compressor through connection/disconnection of an electromagnetic clutch can be applied.

A refrigerant inlet side of a condenser 12a of a heat radiator 12 is connected to a discharge port of the compressor 11. The heat radiator 12 is a radiation heat exchanger which performs heat exchange between a high-pressure refrigerant discharged from the compressor 11 and a vehicle exterior air (outside air) blown by a cooling fan 12d to radiate the heat of the high-pressure refrigerant for cooling.

More specifically, the heat radiator 12 is a so-called subcooling condenser including: the condenser 12a, a receiver part 12b, and a subcooling portion 12c. The condenser 12a performs heat exchange between the high pressure gas-phase refrigerant discharged from the compressor 11 and the outside air blown from the cooling fan 12d, and radiates the heat of the high pressure gas-phase refrigerant to condense the refrigerant. The receiver part 12b separates gas and liquid of the refrigerant that has flowed out of the condenser 12a and stores a surplus liquid-phase refrigerant. The subcooling portion 12c performs heat exchange between the liquid-phase refrigerant that has flowed out of the receiver part 12b and the outside air blown from the cooling fan 12d to subcool the liquid-phase refrigerant.

The cooling fan 12d is an electric blower of which the rotation speed (the amount of blast air) is controlled by a control voltage output from the control device. A refrigerant inlet port 31a of the ejector 13 is connected to a refrigerant outlet side of the subcooling portion 12c of the heat radiator 12.

The ejector 13 functions as a refrigerant depressurizing device for depressurizing the high pressure liquid-phase refrigerant of the subcooling state, which flows out of the heat radiator 12, and allowing the refrigerant to flow out to the downstream side. The ejector 13 also functions as refrigerant circulating device (refrigerant transport device) for drawing (transporting) the refrigerant that has flowed out of an evaporator 14 to be described later by the suction action of a refrigerant flow ejected at high speed to circulate the refrigerant. Further, the ejector 13 according to this embodiment also functions as a gas-liquid separation device for separating the depressurized refrigerant into gas and liquid.

Figure 3:
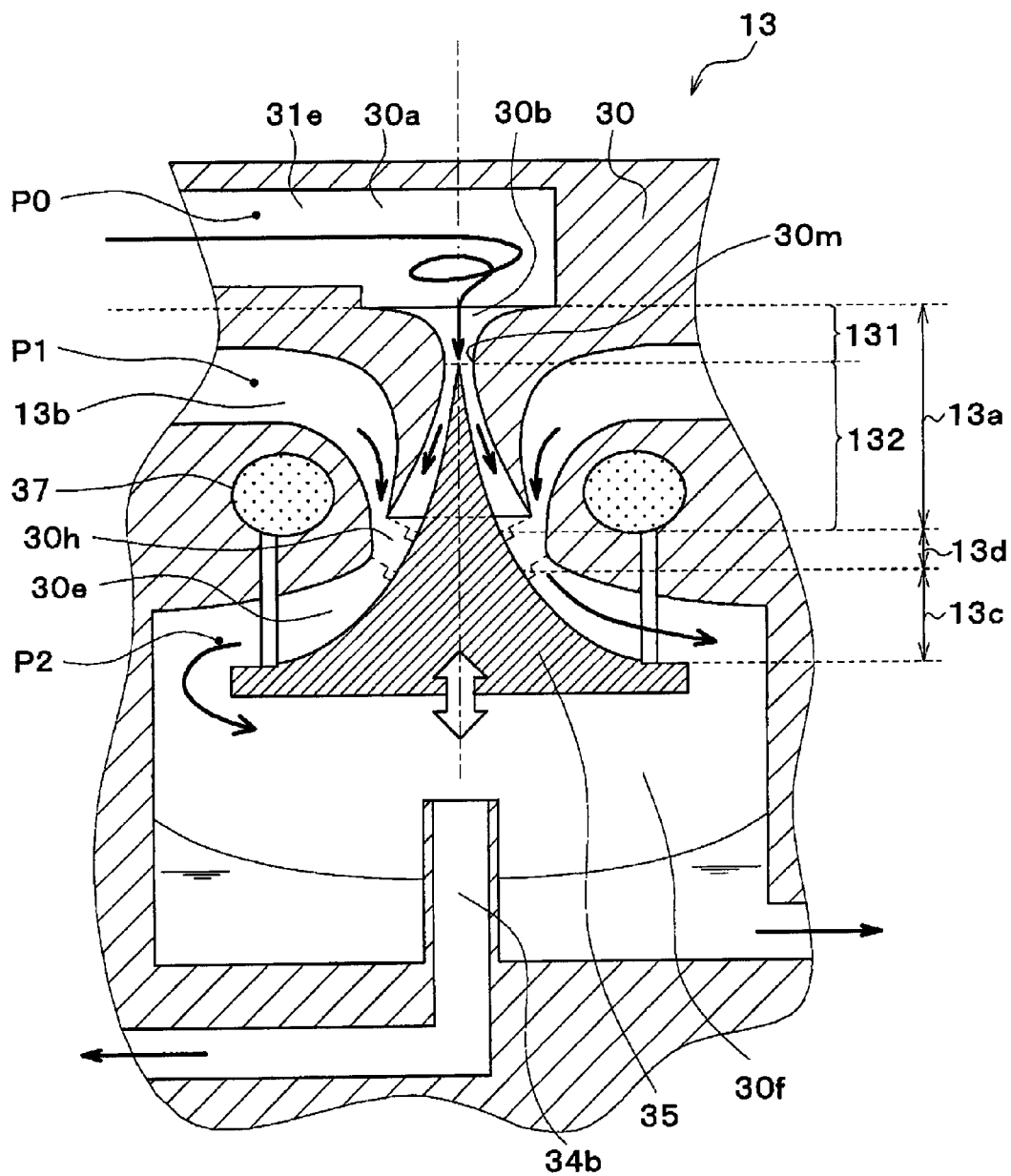
FIG. 3 is a schematic sectional diagram illustrating respective refrigerant passages of the ejector according to the first embodiment.
Figure 4:
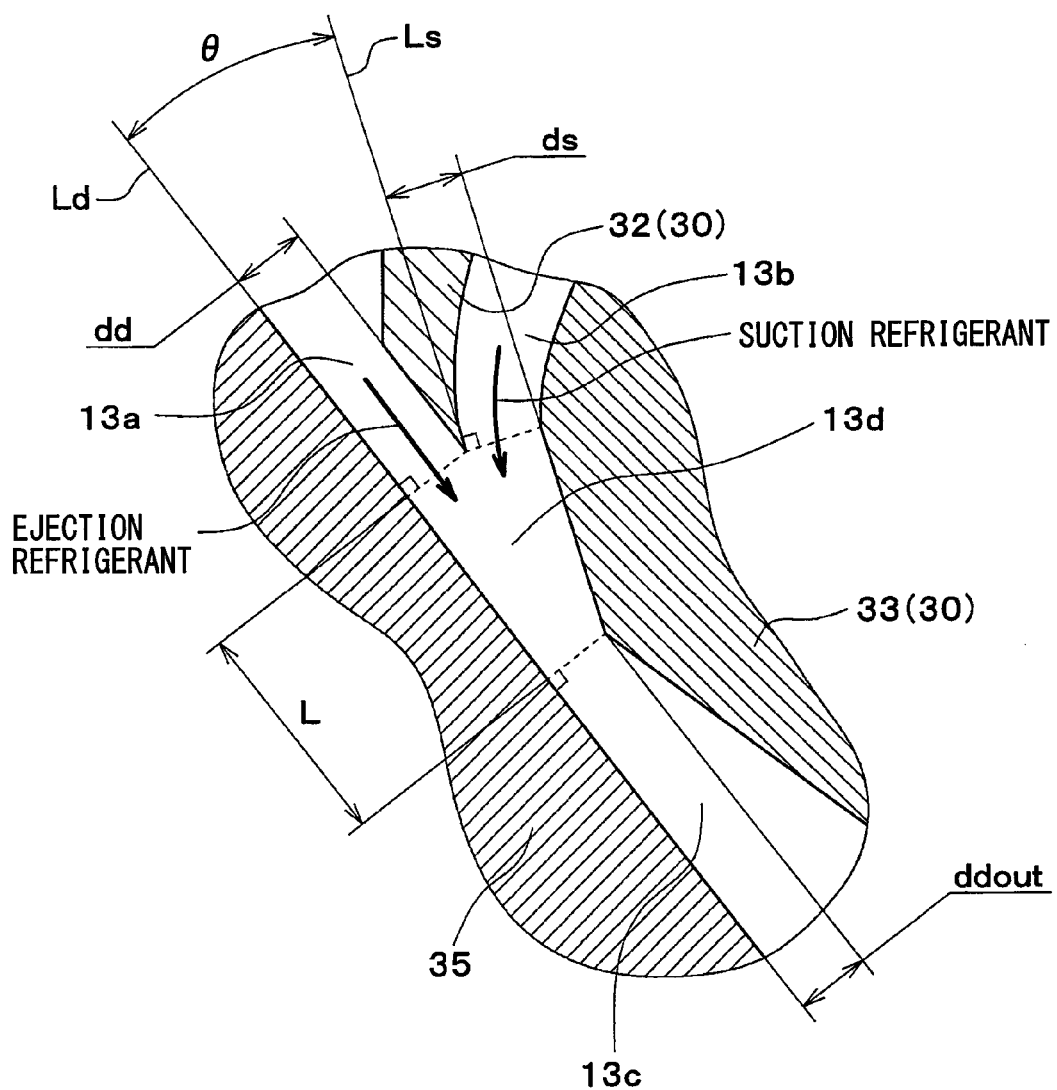
FIG. 4 is a diagram illustrating a portion IV in FIG. 2.

A specific configuration of the ejector 13 will be described with reference to FIGS. 2 to 4. Meanwhile, up and down arrows in FIG. 2 indicate, respectively, up and down directions in a state where the ejector refrigeration cycle 10 is mounted on a vehicle air conditioning apparatus. FIGS. 3 and 4 are schematic cross-sectional views illustrating the functions of the respective refrigerant passages of the ejector 13, and the same parts as those in FIG. 2 are denoted by identical symbols.

Figure 2:
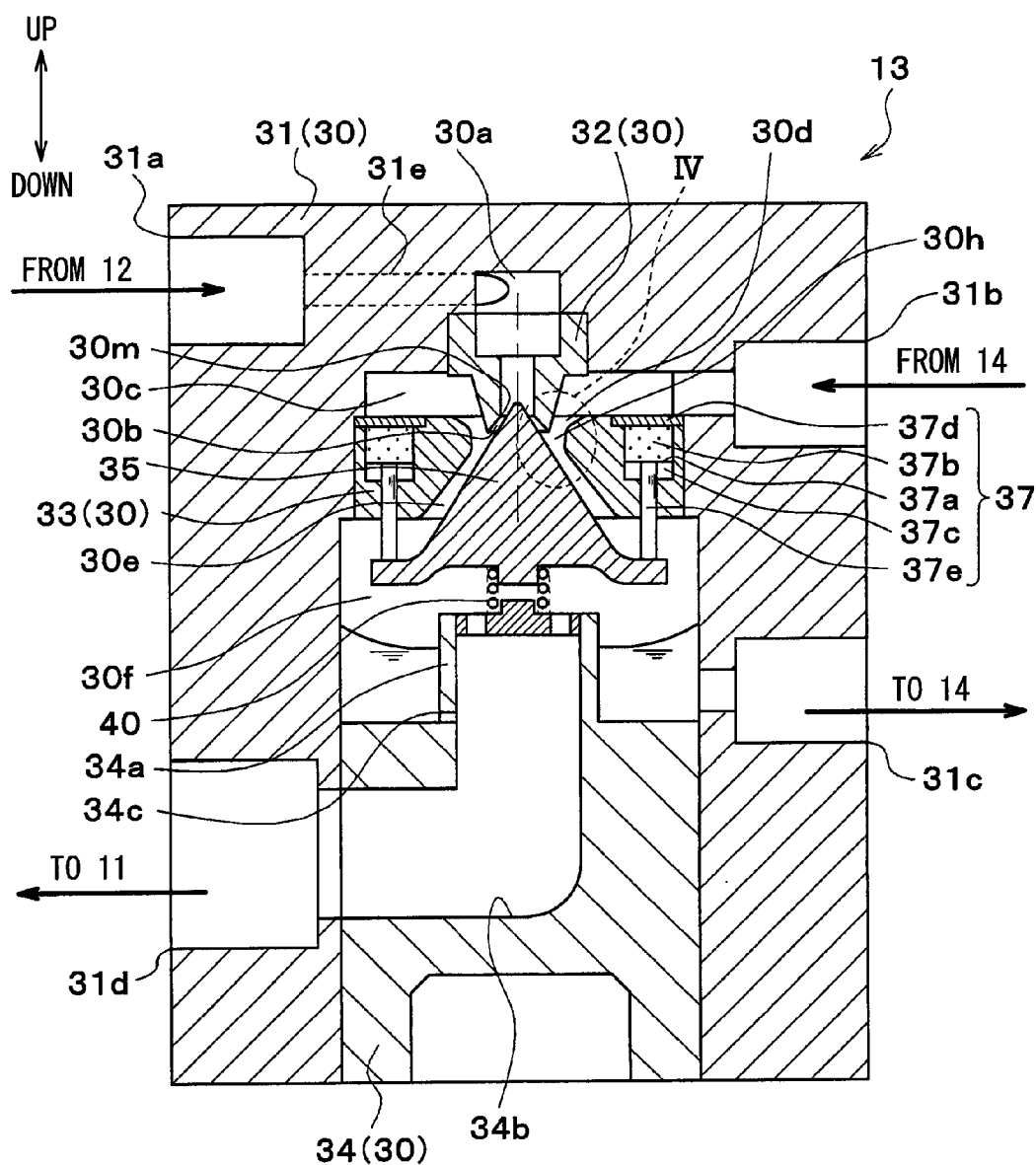
FIG. 2 is a sectional view parallel to an axial direction of an ejector according to the first embodiment.

First, as illustrated in FIG. 2, the ejector 13 according to this embodiment includes a body 30 configured by the combination of plural components. Specifically, the body part 30 has a housing body 31 made of prismatic-cylindrical or circular-cylindrical metal or resin, and forming an outer shell of the ejector 13. A nozzle body 32, a middle body 33, and a lower body 34 are fixed to an interior of the housing body 31.

The housing body 31 is formed with a refrigerant inlet port 31a through which the refrigerant that has flowed out of the heat radiator 12 flows into the housing body 31, and a refrigerant suction port 31b through which the refrigerant that has flowed out of the evaporator 14 is drawn into the housing body 31. The housing body 31 is also formed with a liquid-phase refrigerant outlet 31c through which a liquid-phase refrigerant separated by a gas-liquid separation space 30f formed within the body 30 flows out to the refrigerant inlet side of the evaporator 14, and a gas-phase refrigerant outlet port 31d through which the gas-phase refrigerant separated by the gas-liquid separation space 30f flows out to the intake side of the compressor 11.

The nozzle body 32 is formed of a substantially conically-shaped metal member that is tapered in a refrigerant flowing direction. The nozzle body 32 is fixed to the interior of the housing body 31 by a technique such as press fitting so that an axial direction of the nozzle body 32 is parallel to a vertical direction (up-down direction in FIG. 2). A swirling space 30a in which the refrigerant flowing from the refrigerant inlet port 31a is swirled is provided between an upper side of the nozzle body 32 and the housing body 31.

The swirling space 30a is formed into a rotating body shape, and its center axis indicated by an alternate long and short dash line in FIG. 2 extends in the vertical direction.

Meanwhile, the rotating body shape is a solid shape formed by rotating a plane figure around one straight line (center axis) coplanar with the plane figure. More specifically, the swirling space 30a according to this embodiment is formed into a substantially cylindrical shape. The swirling space 30a may be defined in a shape in which a circular cone or a circular truncated cone is combined with a cylinder, or the like.

Further, a refrigerant inlet passage 31e that connects the refrigerant inlet port 31a and the swirling space 30a extends in a tangential direction of an inner wall surface of the swirling space 30a when viewed in a center axis direction of the swirling space 30a. With this configuration, the refrigerant that has flowed into the swirling space 30a from the refrigerant inlet passage 31e flows along an inner wall surface of the swirling space 30a, and swirls within the swirling space 30a.

Meanwhile, the refrigerant inlet passage 31e does not need to be formed to completely match the tangential direction of the swirling space 30a when viewed in the center axis direction of the swirling space 30a. If the refrigerant inlet passage 31e includes at least a component in the tangential direction of the swirling space 30a, the refrigerant inlet passage 31e may be formed to include components in the other directions (for example, components in the axial direction of the swirling space 30a).

Since a centrifugal force acts on the refrigerant swirling in the swirling space 30a, the pressure of a refrigerant present on the center axis side becomes lower than the pressure of a refrigerant present on the outer peripheral side in the swirling space 30a. Accordingly, in this embodiment, during the normal operation of the ejector refrigeration cycle 10, the pressure of a refrigerant present on the center axis side in the swirling space 30a is lowered to a pressure at which a liquid-phase refrigerant is saturated or a pressure at which a refrigerant is decompressed and boiled (cavitation occurs).

The adjustment of the pressure of a refrigerant present on the center axis side in the swirling space 30a can be realized by adjusting the swirling flow rate of the refrigerant swirling in the swirling space 30a. Further, the swirling flow rate can be conducted by, for example, adjusting an area ratio between the passage sectional area of the refrigerant inlet passage 31e and the sectional area of the swirling space 30a perpendicular to the axial direction. Meanwhile, the swirling flow rate in this embodiment means the flow rate of the refrigerant in the swirling direction in the vicinity of the outermost peripheral part of the swirling space 30a.

A depressurizing space 30b that allows the refrigerant that has flowed out from the swirling space 30a to be depressurized, and flow out to the downstream side is defined within the nozzle body 32. The depressurizing space 30b is defined into a rotating body shape having a cylindrical space coupled with a circular truncated conical space that gradually expands in a refrigerant flowing direction continuously from a lower side of the cylindrical space. A center axis of the depressurizing space 30b is arranged coaxially with the center axis of the swirling space 30a.

Further, a passage formation member 35 is disposed in the interior of the depressurizing space 30b. The passage formation member 35 forms a minimum passage area part 30m smallest in the refrigerant passage area within the depressurizing space 30b, and changes the passage area of the minimum passage area part 30m. The passage formation member 35 is formed in an approximately cone shape which is gradually widened toward a downstream side of a refrigerant flow, and a center axis of the passage formation member 35 is disposed coaxially with the center of the depressurizing space 30b. In other words, the passage formation member 35 is formed into a conical shape having a cross-sectional area that increases with distance from the depressurizing space 30b.

The refrigerant passage is formed between an inner peripheral surface of a portion of the nozzle body 32 which defines the depressurizing space 30b and an outer peripheral surface of the upper side of the passage formation member 35. As illustrated in FIG. 3, the refrigerant passage includes a convergent part 131 and a divergent part 132. The convergent part 131 is formed on the upstream side of the minimum passage area part 30m in the refrigerant flow, in which the refrigerant passage area extending to the minimum passage area part 30m gradually decreases. The divergent part 132 is formed on the downstream side of the minimum passage area part 30m in the refrigerant flow, in which the refrigerant passage area gradually increases.

In the divergent part 132, since the depressurizing space 30b overlaps with the passage formation member 35 when viewed from the radial direction, a sectional shape of the refrigerant passage perpendicular to the axial direction is annular (doughnut shape obtained by removing a smaller-diameter circular shape arranged coaxially from the larger-diameter circular shape). Further, since a spread angle of the passage formation member 35 of this embodiment is smaller than a spread angle of the circular truncated conical space of the depressurizing space 30b, the refrigerant passage area of the divergent part 132 gradually enlarges toward the downstream side in the refrigerant flow.

In this embodiment, in the depressurizing space 30b, a refrigerant passage defined between an inner peripheral surface of the nozzle body 32 and an outer peripheral surface of a top side of the passage formation member 35 is a nozzle passage 13a that functions as a nozzle. Further, in the nozzle passage 13a, the refrigerant is depressurized, and a flow rate of the refrigerant in a gas-liquid two-phase state is accelerated to a value higher than a two-phase sonic speed, and ejected.

In this embodiment, as illustrated in FIG. 3, the refrigerant passage provided between the inner peripheral surface of the depressurizing space 30b and the outer peripheral surface on the top side of the passage formation member 35 is a refrigerant passage defined in an area where a line segment extending from the outer peripheral surface of the passage formation member 35 in a normal direction crosses a portion of the nozzle body 32 forming the depressurizing space 30b.

Since the refrigerant flowing into the nozzle passage 13a swirls in the swirling space 30a, the refrigerant flowing through the nozzle passage 13a, and the ejection refrigerant that is jetted from the nozzle passage 13a also have a velocity component in a direction of swirling in the same direction as that of the refrigerant swirling in the swirling space 30a.

Next, as illustrated in FIG. 2, the middle body 33 is formed of a disc-shaped member made of metal which defines a through-hole of the rotating body shape which penetrates through both sides thereof in the center of the middle body 33. The middle body 33 accommodates a driving device 37 on a radially outer side of the through-hole, and the driving device 37 displaces the passage formation member 35. Meanwhile, a center axis of the through-hole of the middle body 33 is arranged coaxially with the center axes of the swirling space 30a and the depressurizing space 30b. The middle body 33 is fixed to the interior of the housing body 31 and the lower side of the nozzle body 32 by a technique such as press fitting.

Further, an inflow space 30c is formed between an upper surface of the middle body 33 and an inner wall surface of the housing body 31 facing the middle body 33, and the inflow space 30c accumulates the refrigerant that has flowed out of the refrigerant suction port 31b. Meanwhile, in this embodiment, because a tapered tip of a lower end of the nozzle body 32 is located within the through-hole of the middle body 33, the inflow space 30c is formed into an annular shape in cross-section when viewed in the center axis direction of the swirling space 30a and the depressurizing space 30b.

A suction refrigerant inflow passage connecting the refrigerant suction port 31b and the inflow space 30c extends in a tangential direction of the inner peripheral wall surface of the inflow space 30c when viewed from the center axis direction of the inflow space 30c. With the above configuration, in this embodiment, the refrigerant flowing into the inflow space 30c from the refrigerant suction port 31b through the suction refrigerant inflow passage is swirled in the same direction as that of the refrigerant in the swirling space 30a.

The through-hole of the middle body 33 has a part in which a refrigerant passage area is gradually reduced toward the refrigerant flowing direction so as to match an outer peripheral shape of the tapered tip of the nozzle body 32 in an area where the lower side of the nozzle body 32 is inserted, that is, an area in which the middle body 33 and the nozzle body 32 overlap with each other when viewed in a radial direction perpendicular to the axis line.

Accordingly, a suction passage 30d is defined between an inner peripheral surface of the through-hole and an outer peripheral surface of a tapered tip of the lower side of the nozzle body 32, and the inflow space 30c communicates with a downstream side of the depressurizing space 30b in the refrigerant flow through the suction passage 30d. That is, in this embodiment, a suction passage 13b that draws a refrigerant from the external is defined by the suction refrigerant inflow passage which connects the refrigerant suction port 31b and the inflow space 30c, the inflow space 30c, and the suction passage 30d.

A section perpendicular to a center axis of the suction passage 13b is also formed in an annular shape, and a refrigerant flowing through the suction passage 13b also has a velocity component of the refrigerant swirling in the same direction as the swirl direction of the refrigerant swirling in the swirling space 30a. A refrigerant outlet (specifically, a refrigerant outlet of the suction passage 30d) of the suction passage 13b is annularly opened to an outer peripheral side of a refrigerant outlet (refrigerant ejection port) of the nozzle passage 13a.

A mixing space 30h formed into a substantially cylindrical or substantially circular truncated conical shape is formed in the through-hole of the middle body 33 on the downstream side of the suction passage 30d in the refrigerant flow. The mixing space 30h is a space into which the ejection refrigerant ejected from the above-mentioned depressurizing space 30b (specifically, nozzle passage 13a) and the suction refrigerant drawn from the suction passage 13b (specifically, suction passage 30d) are converged.

An intermediate portion of the above-mentioned passage formation member 35 in a vertical direction is disposed in the mixing space 30h, and as illustrated in FIGS. 3 and 4, the refrigerant passage defined between the inner peripheral surface of the middle body 33 and the outer peripheral surface of the passage formation member 35 in the mixing space 30h configures a mixing passage 13d that promotes the mixture of the ejection refrigerant and the suction refrigerant.

In this embodiment, as illustrated in FIG. 3, the refrigerant passage provided between the inner peripheral surface of the mixing space 30h and the outer peripheral surface of the passage formation member 35 is a refrigerant passage defined in an area where a line segment extending from the outer peripheral surface of the passage formation member 35 in the normal direction crosses a portion of the middle body 33 forming the mixing space 30h.

Now, the detailed shape of the mixing passage 13d will be described with reference to FIG. 4. First, the mixing passage 13d according to this embodiment is formed into a shape gradually reduced in the passage cross-sectional area toward the downstream side in the refrigerant flow.

In more detail, the passage cross-sectional area of the mixing passage 13d can be defined as an area of an outer peripheral side surface formed into a truncated conical shape formed when rotating around the axis a line segment extending from the outer peripheral surface of the passage formation member 35 in the normal direction, and reaching the inner peripheral surface of the mixing space 30h in the middle body 33. The "toward the downstream side in the refrigerant flow" can be defined by the meaning of "toward the downstream side from the upper side along the outer peripheral surface of the passage formation member 35 in the cross-section of the passage formation member 35 in the axial direction".

Further, it is assumed that a passage cross-sectional area of the refrigerant outlet portion (refrigerant ejection port) of the nozzle passage 13a is φd, a passage cross-sectional area of the refrigerant outlet portion of the suction passage 13b is φs, a passage cross-sectional area of the refrigerant outlet of the mixing passage 13d is φdout, an equivalent diameter when converting a total value (φd+φs) of the passage cross-sectional area φd of the refrigerant outlet portion of the nozzle passage 13a and the passage cross-sectional area φs of the refrigerant outlet portion of the suction passage 13b into a circle is D, and a length of a site defining the mixing passage 13d in a length of the outer peripheral surface of the passage formation member 35 in the cross-section of the passage formation member 35 in the axial direction is L. In this case, the mixing passage 13d in this embodiment is defined in an area satisfying the following Formula F1, and the passage cross-sectional area φdout is set to satisfy the following Formula F2.

$$L/D \leq 1 \tag{F1}$$

$$\varphi dout \leq \varphi d + \varphi s \tag{F2}$$

The passage cross-sectional area φd can be defined as an area of the outer peripheral side surface formed into a truncated conical shape when rotating around the axis a line segment (distance dd in FIG. 4) extending from the outer peripheral surface of the passage formation member 35 in the normal direction, and reaching the downstream most portion of a site forming the depressurizing space 30b of the nozzle body 32 in the refrigerant flow, in the cross-section of the passage formation member 35 in the axial direction.

The passage cross-sectional area φs can be defined as an area of the outer peripheral side surface formed into a truncated conical shape when rotating around the axis a line segment (distance ds in FIG. 4) extending from the outer peripheral surface of a tapered tip of the lower side of the nozzle body 32 in the normal direction, and reaching the downstream most portion of a site forming the suction passage 30d of the middle body 33 in the refrigerant flow, in the cross-section of the passage formation member 35 in the axial direction.

The passage cross-sectional area φdout can be defined as an area of the outer peripheral side surface formed into a truncated conical shape when rotating around the axis a line segment (distance ddout in FIG. 4) extending from the outer peripheral surface of the passage formation member 35 in the normal direction, and reaching the downstream most portion of a site forming the mixing space 30h of the middle body 33 in the refrigerant flow.

Further, in this embodiment, in the cross-section of the passage formation member 35 in the axial direction, an intersection angle θ between a tangent line Ld on the most upstream portion of a site forming the mixing passage 13d in the outer peripheral surface of the passage formation member 35, and a tangent line Ls on the downstream most portion of a site forming the suction passage 30d of the middle body 33 in the refrigerant flow is set to satisfy the following Formula F3.

$$0 < \theta \leq 60° \tag{F3}$$

The intersection angle θ is an angle defined on a side where the nozzle passage 13a is interposed in an angle defined between the tangent line Ld and the tangent line Ls in the cross-section of the passage formation member 35 in the axial direction. In the cross-section of the passage formation member 35 in the axial direction, as illustrated in FIG. 4, when the most upstream portion of a site forming the mixing passage 13d in the outer peripheral surface of the passage formation member 35 is drawn by a straight line, the straight line may be set as the tangent line Ld. The same is applied to the tangent line Ls.

A sectional shape perpendicular to an axial direction of the mixing passage 13d is also formed in an annular shape, and a refrigerant flowing through the mixing passage 13d also has a velocity component of the refrigerant swirling in the same direction as the swirl direction of the refrigerant swirling in the swirling space 30a due to the velocity component in the swirl direction of the ejection refrigerant ejected from the nozzle passage 13a and the velocity component in the swirl direction of the suction refrigerant drawn from the suction passage 13b.

As illustrated in FIG. 2, a pressurizing space 30e formed into a substantially truncated conical shape gradually enlarged in the refrigerant flowing direction is formed in the through-hole of the middle body 33 on the downstream side of the mixing passage space in the refrigerant flow. The pressurizing space 30e is a space into which the refrigerant that has flowed out of the mixing space 30h (specifically, the mixing passage 13d) flows.

A lower portion of the above-mentioned passage formation member 35 is disposed in the pressurizing space 30e. Further, a spread angle of the conical-shaped side surface of the passage formation member 35 in the pressurizing space 30e is smaller than a spread angle of the circular truncated conical space of the pressurizing space 30e. Therefore, the refrigerant passage area of the refrigerant passage is gradually enlarged toward the downstream side in the refrigerant flow.

In this embodiment, with the enlargement of the refrigerant passage area as described above, as illustrated in FIG. 3, the refrigerant passage formed between the inner peripheral surface of the middle body 33 and the outer peripheral surface of the lower side of the passage formation member 35 in the pressurizing space 30e is a diffuser passage 13c functioning as a diffuser. The diffuser passage 13c converts velocity energy of the mixed refrigerants mixed in the mixing passage 13d into a pressure energy.

A sectional shape perpendicular to an axial direction of the diffuser passage 13c is also formed into an annular shape, and a refrigerant flowing through the diffuser passage 13c also has a velocity component of the refrigerant swirling in the same direction as the swirl direction of the refrigerant swirling in the swirling space 30a due to the velocity component in the swirl direction of the ejection refrigerant ejected from the nozzle passage 13a and the velocity component in the swirl direction of the suction refrigerant drawn from the suction passage 13b.

Next, the driving device 37 that is arranged within the middle body 33 and displaces the passage formation member 35 will be described. The driving device 37 is configured with a circular laminated diaphragm 37a which is a pressure responsive member. More specifically, as illustrated in FIG. 2, the diaphragm 37a is fixed by a technique such as welding so as to partition a cylindrical space defined on the outer peripheral side of the middle body 33 into two upper and lower spaces.

The upper space (the inflow space 30c side) of the two spaces partitioned by the diaphragm 37a configures a sealed space 37b in which a temperature sensitive medium is enclosed. A pressure of the temperature sensitive medium changes according to a temperature of the refrigerant that has flowed out of the evaporator 14. A temperature sensitive medium having the same composition as that of the refrigerant circulating through the ejector refrigeration cycle 10 is sealed in the sealed space 37b at predetermined density. Accordingly, the temperature sensitive medium of this embodiment is R134a.

On the other hand, the lower space of the two spaces partitioned by the diaphragm 37a configures an introduction space 37c into which the refrigerant that has flowed out of the evaporator 14 is introduced through a communication channel not shown. Therefore, the temperature of the refrigerant that has flowed out of the evaporator 14 is transmitted to the temperature sensitive medium enclosed in the sealed space 37b via a cap member 37d and the diaphragm 37a. The cap member 37d partitions the inflow space 30c and the sealed space 37b.

In this example, as apparent from FIGS. 2 and 3, the suction passage 13b is arranged on the upper side of the middle body 33 in this embodiment, and the diffuser passage 13c is arranged on the lower side of the middle body 33. Therefore, at least a part of the driving device 37 is arranged at a position sandwiched by the suction passage 13b and the diffuser passage 13c from the vertical direction when viewed from the radial direction of the axis line.

In more detail, the sealed space 37b of the driving device 37 is arranged at a position where the suction passage 13b overlaps with the diffuser passage 13c and at a position surrounded by the suction passage 13b and the diffuser passage 13c when viewed from a center axis direction of the swirling space 30a and the passage formation member 35. With this configuration, the temperature of the refrigerant that has flowed out of the evaporator 14 is transmitted to the sealed space 37b, and an internal pressure within the sealed space 37b becomes a pressure corresponding to the temperature of the refrigerant that has flowed out of the evaporator 14.

Further, the diaphragm 37a is deformed according to a differential pressure between the internal pressure of the sealed space 37b and the pressure of the refrigerant which has flowed into the introduction space 37c from the evaporator 14. For that reason, it is preferable that the diaphragm 37a is made of a material rich in elasticity, excellent in heat conduction, and tough. For example, it is desirable that the diaphragm 37a is formed of a metal laminate made of stainless steel (SUS304).

An upper end side of a cylindrical actuating bar 37e is joined to a center part of the diaphragm 37a by a technique such as welding, and a lower end side of the actuating bar 37e is fixed to an outer peripheral and lowermost side (bottom) of the passage formation member 35. With this configuration, the diaphragm 37a and the passage formation member 35 are coupled with each other, and the passage formation member 35 is displaced in accordance with a displacement of the diaphragm 37a to regulate the refrigerant passage area of the nozzle passage 13a (passage cross-sectional area in the minimum passage area part 30m).

Specifically, when the temperature (the degree of superheat) of the refrigerant following out of the evaporator 14 rises, a saturated pressure of the temperature sensitive medium enclosed in the sealed space 37b rises to increase a differential pressure obtained by subtracting the pressure of the introduction space 37c from the internal pressure of the sealed space 37b. Accordingly, the diaphragm 37a displaces the passage formation member 35 in a direction of enlarging the passage cross-sectional area in the minimum passage area part 30m (downward in the vertical direction).

On the other hand, when the temperature (the degree of superheat) of the refrigerant flowing out of the evaporator 14 falls, a saturated pressure of the temperature sensitive medium enclosed in the sealed space 37b falls to decrease the differential pressure obtained by subtracting the pressure of the introduction space 37c from the internal pressure of the sealed space 37b. With the above configuration, the diaphragm 37a displaces the passage formation member 35 in a direction of reducing the passage cross-sectional area of the minimum passage area part 30m (upward in the vertical direction).

The diaphragm 37a displaces the passage formation member 35 vertically according to the superheat of the refrigerant that has flowed out of the evaporator 14 as described above. As a result, the passage cross-sectional area of the minimum passage area part 30m is adjusted so that the degree of superheat of the refrigerant that has flowed out of the evaporator 14 comes closer to a predetermined value. A gap between the actuating bar 37e and the middle body 33 is sealed by a seal member such as an O-ring not shown, and the refrigerant is not leaked through the gap even if the actuating bar 37e is displaced.

The bottom of the passage formation member 35 is subjected to a load of a coil spring 40 fixed to the lower body 34. The coil spring 40 exerts the load urging the passage formation member 35 so as to reduce the passage cross-sectional area in the minimum passage area part 30m (upper side in FIG. 2). With the regulation of this load, a valve opening pressure of the passage formation member 35 can be changed to change a target degree of superheat.

Further, in this embodiment, the multiple (specifically, two) cylindrical spaces are provided in the part of the middle body 33 on the outer peripheral side, and the respective circular laminated diaphragms 37a are fixed in those spaces to configure two driving devices 37. However, the number of driving devices 37 is not limited to this number. When the driving devices 37 are provided at plural locations, it is desirable that the driving devices 37 are arranged at regular angular intervals with respect to the respective center axes.

Alternatively, a diaphragm formed of the annular thin plate may be fixed in a space having an annular shape when viewed from the axial direction, and the diaphragm and the passage formation member 35 may be coupled with each other by multiple actuating bars.

Next, the lower body 34 is formed of a circular-cylindrical metal member, and fixed in the housing body 31 by a technique such as screwing so as to close a bottom of the housing body 31. In the internal space of the housing body 31, the gas-liquid separation space 30f that separates gas and liquid of the refrigerant that has flowed out of the diffuser passage 13c from each other is provided between the upper side of the lower body 34 and the bottom side of the middle body 33.

The gas-liquid separation space 30f is defined as a space of a substantially cylindrical rotating body shape, and the center axis of the gas-liquid separation space 30f is also arranged coaxially with the center axes of the swirling space 30a, the depressurizing space 30b, and the passage formation member 35.

As described above, the refrigerant, which flows out from the diffuser passage 13c and flows into the gas-liquid separation space 30f, has the velocity component of the refrigerant swirling in the same direction as the swirl direction of the refrigerant swirling in the swirling space 30a. Accordingly, gas and liquid of the refrigerant in the gas-liquid separation space 30f are separated by action of a centrifugal force.

A cylindrical pipe 34a that is arranged coaxially with the gas-liquid separation space 30f and extends upward is disposed in the center part of the lower body 34. The liquid-phase refrigerant separated in the gas-liquid separation space 30f is accumulated on an outer peripheral side of the pipe 34a. A gas-phase refrigerant outflow passage 34b is provided inside the pipe 34a and guides the gas-phase refrigerant separated in the gas-liquid separation space 30f to the gas-phase refrigerant outlet port 31d.

Further, the above-mentioned coil spring 40 is fixed to an upper end of the pipe 34a. The coil spring 40 also functions as a vibration absorbing member that attenuates the vibration of the passage formation member 35, which is caused by a pressure pulsation generated when the refrigerant is depressurized. An oil return hole 34c that returns a refrigerator oil in the liquid-phase refrigerant into the compressor 11 through the gas-phase refrigerant outflow passage 34b is formed on a base part (lowermost part) of the pipe 34a.

The liquid-phase refrigerant outlet port 31c of the ejector 13 is connected with an inlet side of the evaporator 14 as illustrated in FIG. 1. The evaporator 14 is a heat-absorbing heat exchanger that evaporates a low-pressure refrigerant depressurized by the ejector 13 and performs a heat absorbing effect by exchanging heat between the low-pressure refrigerant and blast air that is blown into the vehicle interior from a blower fan 14a.

The blower fan 14a is an electric blower of which the rotation speed (the amount of blast air) is controlled by a control voltage output from the control device. The refrigerant suction port 31b of the ejector 13 is connected to an outlet side of the evaporator 14. Further, the gas-phase refrigerant outlet port 31d of the ejector 13 is connected with the intake side of the compressor 11.

Next, the control device (not shown) includes a well-known microcomputer including a CPU, a ROM and a RAM, and peripheral circuits of the microcomputer. The control device controls the operations of the above-mentioned various electric actuators 11b, 12d, and 14a and the like by performing various calculations and processing on the basis of a control program stored in the ROM.

Further, an air conditioning control sensor group such as an inside air temperature sensor for detecting a vehicle interior temperature, an outside air temperature sensor for detecting the temperature of outside air, an insolation sensor for detecting the amount of insolation in the vehicle interior, an evaporator-temperature sensor for detecting the blow-out air temperature from the evaporator 14 (the temperature of the evaporator), an outlet-side temperature sensor for detecting the temperature of a refrigerant on the outlet side of the heat radiator 12, and an outlet-side pressure sensor for detecting the pressure of a refrigerant on the outlet side of the heat radiator 12, is connected to the control device. Accordingly, detection values of the sensor group are input to the control device.

Furthermore, an operation panel (not shown), which is disposed near a dashboard panel positioned at the front part in the vehicle interior, is connected to the input side of the control device, and operation signals output from various operation switches mounted on the operation panel are input to the control device. An air conditioning operation switch that is used to perform air conditioning in the vehicle interior, a vehicle interior temperature setting switch that is used to set the temperature of the vehicle interior, and the like are provided as the various operation switches that are mounted on the operation panel.

Meanwhile, the control device of this embodiment is integrated with a control unit for controlling the operations of various control target devices connected to the output side of the control device, but a structure (hardware and software), which controls the operations of the respective control target devices, of the control device forms the control unit of the respective control target devices. For example, a structure (hardware and software), which controls the operation of the electric motor 11b of the compressor 11, forms a discharge capability control unit in this embodiment.

Next, the operation of this embodiment having the above-mentioned configuration will be described with reference to a Mollier diagram of FIG. 5. A vertical axis of the Mollier diagram indicates pressures corresponding to P0, P1, and P2 of FIG. 3. First, when an operation switch of an operation panel is turned on, the control device actuates the electric motor 11b of the compressor 11, the cooling fan 12d, the blower fan 14a, or the like. Accordingly, the compressor 11 draws and compresses a refrigerant and discharges the refrigerant.

The gas-phase refrigerant (point a5 in FIG. 5), which is discharged from the compressor 11 and has a high temperature and a high pressure, flows into the condenser 12a of the heat radiator 12 and is condensed by exchanging heat between the blast air (outside air), which is blown from the cooling fan 12d, and itself and by radiating heat. Gas and liquid of the refrigerant radiated by the condenser 12a are separated by the receiver portion 12b. A liquid-phase refrigerant, which has been subjected to gas-liquid separation in the receiver part 12b, is changed into a subcooled liquid-phase refrigerant by exchanging heat between the blast air, which is blown from the cooling fan 12d, and itself in the subcooling portion 12c and further radiating heat (from point a5 to point b5 in FIG. 5).

Figure 5:
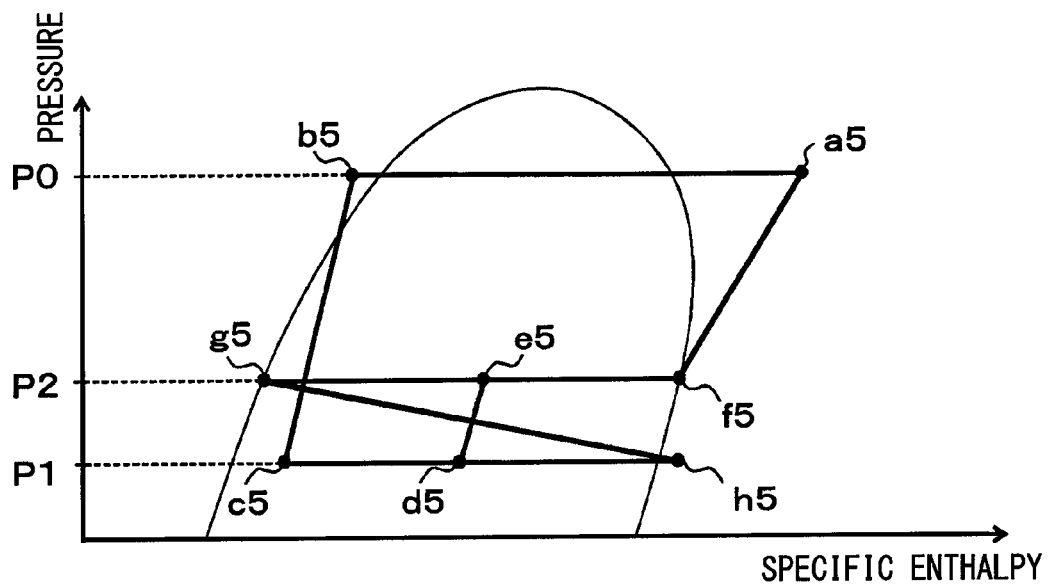
FIG. 5 is a Mollier diagram illustrating a state of a refrigerant in the ejector refrigeration cycle according to the first embodiment.

The subcooled liquid-phase refrigerant that has flowed out of the subcooling portion 12c of the heat radiator 12 is isentropically depressurized by the nozzle passage 13a, and ejected (from point b5 to point c5 in FIG. 5). The nozzle passage 13a is formed between the inner peripheral surface of the depressurizing space 30b of the ejector 13 and the outer peripheral surface of the passage formation member 35. In this situation, the refrigerant passage area of the depressurizing space 30b in the minimum passage area part 30m is regulated so that the degree of superheat of the refrigerant on the outlet side of the evaporator 14 comes close to a predetermined value.

The refrigerant that has flowed out of the evaporator 14 is drawn through the refrigerant suction port 31*b* and the suction passage 13*b* (in more detail, the inflow space 30*c* and the suction passage 30*d*) due to the suction action of the ejection refrigerant which has been jetted from the nozzle passage 13*a*. In addition, the ejection refrigerant jetted from the nozzle passage 13*a* and the suction refrigerant drawn through the suction passage 13*b* and the like flow into the mixing passage 13*d*, and are mixed together (from point c5 to point d5, and from point h5 to point d5 in FIG. 5).

The mixed refrigerants mixed by the mixing passage 13*d* flow into the diffuser passage 13*c*. In the diffuser passage 13*c*, the velocity energy of the refrigerant is converted into the pressure energy due to the enlarged refrigerant passage area. As a result, a pressure of the mixed refrigerants of the ejection refrigerant and the suction refrigerant increases (from point d5 to point e5 in FIG. 5). The refrigerant that has flowed out of the diffuser passage 13*c* is separated into gas and liquid in the gas-liquid separation space 30*f* (from point e5 to point f5, and from point e5 to point g5 in FIG. 5).

The liquid-phase refrigerant that has been separated in the gas-liquid separation space 30*f* flows out of the liquid-phase refrigerant outlet port 31*c*, and flows into the evaporator 14. The refrigerant which has flowed into the evaporator 14 absorbs heat from blast air blown by the blower fan 14*a*, evaporates, and cools the blast air (point g5 to point h5 in FIG. 5). On the other hand, the gas-phase refrigerant that has been separated in the gas-liquid separation space 30*f* flows out of the gas-phase refrigerant outlet port 31*d*, and is drawn into the compressor 11 and compressed again (point f5 to point a5 in FIG. 5).

The ejector refrigeration cycle 10 according to this embodiment operates as described above, and can cool the blast air to be blown into the vehicle interior. Further, in the ejector refrigeration cycle 10, since the refrigerant pressurized by the diffuser passage 13*c* is drawn into the compressor 11, the drive power of the compressor 11 can be reduced to improve the cycle of performance (COP).

Further, according to the ejector 13 of this embodiment, the refrigerant swirls in the swirling space 30*a* with the results that a refrigerant pressure on a swirling center side in the swirling space 30*a* can be reduced to a pressure of a saturated liquid-phase refrigerant, or a pressure at which the refrigerant is depressurized and boiled (cavitation occurs). With the above operation, a larger amount of gas-phase refrigerant is present on an inner peripheral side than an outer peripheral side of a swirling center axis. This leads to a two-phase separation state in which the refrigerant has a gas single phase in the vicinity of a swirling center line within the swirling space 30*a*, and has a liquid single phase around the vicinity thereof.

The refrigerant that has become in the two-phase separation state as described above flows into the nozzle passage 13*a*. As a result, in the convergent part 131 of the nozzle passage 13*a*, boiling of the refrigerant is promoted by the wall surface boiling generated when the refrigerant is separated from the outer peripheral side wall surface of the annular refrigerant passage, and the interface boiling caused by a boiling nuclear generated by the cavitation of the refrigerant on the center axis side of the annular refrigerant passage. Accordingly, the refrigerant that flows into the minimum passage area part 30*m* of the nozzle passage 13*a* approximates a gas-liquid mixed state in which the gas phase and the liquid phase are uniformly mixed together.

The flow of the refrigerant in the gas-liquid mixed state is blocked (choked) in the vicinity of the minimum passage area part 30*m*. The refrigerant in the gas-liquid mixed state which reaches the sonic speed by the choking is accelerated in the divergent part 132, and ejected. As described above, the refrigerant of the gas-liquid mixed state can be efficiently accelerated to the sonic speed by the boiling promotion caused by both of the wall surface boiling and the interface boiling. As a result, the energy conversion efficiency (corresponding to the nozzle efficiency) in the nozzle passage 13*a* can be improved.

In addition, the ejector 13 of this embodiment employs the passage formation member 35 having a conical shape of which a cross-sectional area increases with distance from the depressurizing space 30*b*. The cross-sectional shape of the diffuser passage 13*c* is formed in an annular shape. Therefore, the diffuser passage 13*c* can have a shape to spread along the outer periphery of the passage formation member 35 with distance from the depressurizing space 30*b*.

With the above configuration, since the flow channel for pressurizing the refrigerant can be formed into the spiral shape in the diffuser passage 13*c*, enlargement of the dimension of the diffuser passage 13*c* in the axial direction (the axial direction of the passage formation member 35) can be limited as compared with a case in which the diffuser portion is shaped to extend in the axial direction of the nozzle portion. As a result, the upsizing of the body of the overall ejector 13 can be limited.

In this example, as in the ejector 13 of this embodiment, in the configuration where the mixing passage 13*d* disposed on the downstream side of the nozzle passage 13*a* is formed into an annular shape on the outer peripheral side of the passage formation member 35, droplets (grains in the liquid-phase refrigerant) in the ejection refrigerant adhere to the outer peripheral surface of the passage formation member 35, resulting in a risk that the droplets in the ejection refrigerant, the gas-phase refrigerant in the ejection refrigerant, and the suction refrigerant (gas-phase refrigerant) cannot be sufficiently mixed together in the mixing passage 13*d*.

When the droplets in the ejection refrigerant, the gas-phase refrigerant in the ejection refrigerant, and the suction refrigerant cannot be sufficiently mixed together, the velocity energy of the droplets in the ejection refrigerant cannot be effectively transmitted to the gas-phase refrigerant in the mixed refrigerants. As a result, the pressure increase amount in the diffuser passage is reduced, and the ejector efficiency is lowered.

On the contrary, according to the ejector 13 of this embodiment, since the mixing passage 13*d* is formed into a shape gradually reduced in the passage cross-sectional area toward a downstream side in the refrigerant flow, mixed refrigerants of the ejection refrigerant and the suction refrigerant flowing into the mixing passage 13*d* can be accelerated. With the above configuration, the pressure of the mixed refrigerants can be gradually reduced toward an outlet side in the mixing passage 13*d*.

Further, since the ejection refrigerant and the suction refrigerant flowing into the mixing passage 13*d* flow toward the outlet side low in pressure, a flow of the ejection refrigerant can be restricted from drifting to the outer peripheral surface side of the passage formation member 35 or the inner peripheral surface side of the site forming the mixing space 30*h* in the middle body 33. In addition, the suction refrigerant can be restricted from flowing from the outer peripheral side of the ejection refrigerant toward the inner peripheral side.

Therefore, droplets (grains of the liquid-phase refrigerant) in the ejection refrigerant can be restricted from adhering to the outer peripheral surface of the passage formation member 35 or the inner peripheral surface of the site of the middle body 33, which forms the mixing space 30h, and the droplets in the ejection refrigerant, the gas-phase refrigerant in the ejection refrigerant, and the suction refrigerant (gas-phase refrigerant) can be sufficiently mixed together in the mixing passage 13d. The velocity energy of the droplets in the ejection refrigerant can be effectively transmitted to the gas-phase refrigerant in the mixed refrigerants.

As a result, the kinetic energy of the mixed refrigerants, which is converted into a pressure energy in the diffuser passage 13c, can be restricted from being reduced, and a reduction in the pressure increase amount in the diffuser passage 13c can be limited. Therefore, a reduction in the ejector efficiency can be limited.

In other words, according to the ejector 13 of this embodiment, even if the mixing passage 13d provided on the downstream side of the nozzle passage 13a is defined on the outer peripheral side of the passage formation member 35, a reduction in the ejector efficiency can be limited.

According to the present inventors' study, it is found that even if the mixing passage 13d is formed into a shape constant in the passage cross-sectional area toward a downstream side in the refrigerant flow, a pressure on the outlet side of the mixing passage 13d can be sufficiently reduced, and the droplets in the ejection refrigerant, the gas-phase refrigerant in the ejection refrigerant, and the suction refrigerant (gas-phase refrigerant) can be sufficiently mixed together in the mixing passage 13d.

Further, according to the present inventors' study, it is confirmed that the area in which the mixing passage 13d is defined and the passage cross-sectional area φdout are so determined as to satisfy the above Formulas F1 and F2, as a result of which the velocity energy of the droplets in the ejection refrigerant can be effectively transmitted to the gas-phase refrigerant in the mixed refrigerants.

In the ejector 13 according to this embodiment, since the intersection angle θ is determined to satisfy the above Formula F3, an inflow direction of the ejection refrigerant flowing into the mixing passage 13d can intersect with an inflow direction of the suction refrigerant flowing into the mixing passage 13d at an acute angle in the cross-section of the passage formation member 35 in the axial direction.

Therefore, an energy loss when the ejection refrigerant flowing into the mixing passage 13d comes into collision with the suction refrigerant flowing into the mixing passage 13d can be reduced, and a reduction in the ejector efficiency can be still more limited.

The gas-liquid separation space 30f that separates gas and liquid of the refrigerant that has flowed out of the diffuser passage 13c is formed in the body 30 of the ejector 13 according to this embodiment. Hence, the capacity of the gas-liquid separation space 30f can be effectively reduced as compared with a case in which a gas-liquid separation device is provided in addition to the ejector 13.

That is, in the gas-liquid separation space 30f according to this embodiment, since the refrigerant that flows out of the diffuser passage 13c having the annular shape in cross-section has been already swirled, there is no need to provide a space for generating or growing the swirling flow of the refrigerant in the gas-liquid separation space 30f. Therefore, the capacity of the gas-liquid separation space 30f can be effectively reduced as compared with the case in which the gas-liquid separating device is provided apart from the ejector 13.

According to the ejector 13 of this embodiment, since the driving device 37 is provided, the passage formation member 35 can be displaced in accordance with a load variation of the ejector refrigeration cycle 10 to regulate the refrigerant passage areas of the nozzle passage 13a and the diffuser passage 13c. Therefore, the ejector 13 can appropriately operate according to the load variation of the ejector refrigeration cycle 10.

Further, since the sealed space 37b in which a temperature sensitive medium is enclosed in the driving device 37 is arranged at a position sandwiched between the suction passage 13b and the diffuser passage 13c, a space formed between the suction passage 13b and the diffuser passage 13c can be effectively utilized. As a result, the body as the overall ejector can be further restricted from being upsized.

Moreover, since the sealed space 37b is arranged at the position surrounded by the suction passage 13b and the diffuser passage 13c, the temperature of the refrigerant that has flowed out of the evaporator 14, of the refrigerant flowing through the suction passage 13b is excellently transmitted to the temperature sensitive medium without being affected by an outside air temperature, and the pressure in the sealed space 37b can be changed accordingly. That is, the pressure within the sealed space 37b can be changed with high precision depending on the temperature of the outflow refrigerant from the evaporator 14.

(Second Embodiment)

Figure 6:
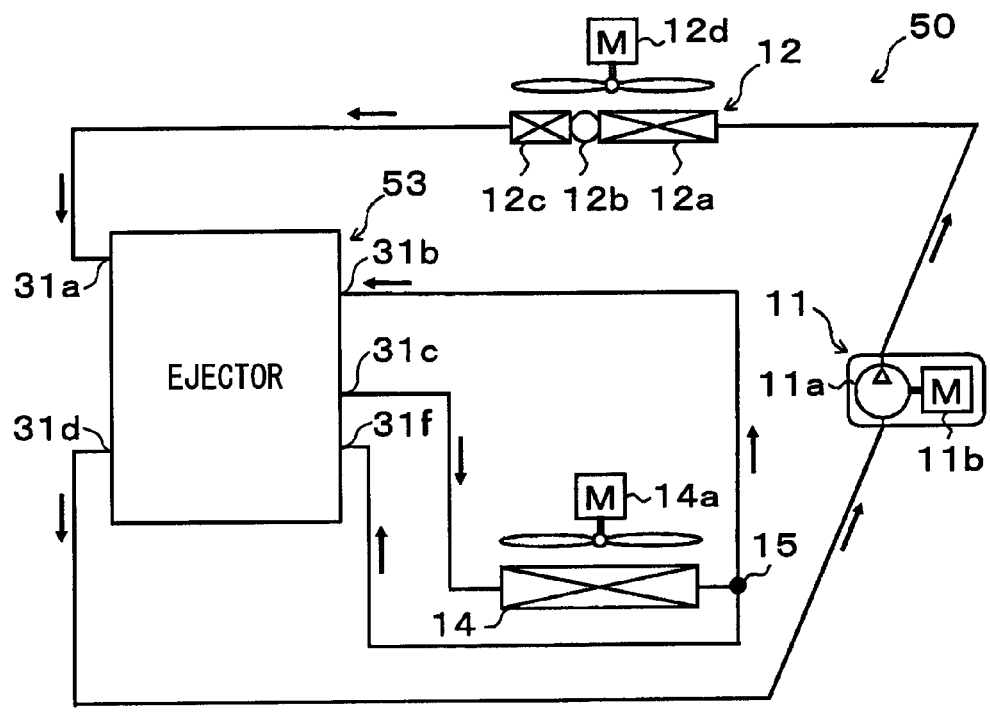
FIG. 6 is a schematic diagram of an ejector refrigeration cycle according to a second embodiment of the present disclosure.

In an ejector refrigeration cycle 50 of this embodiment, as illustrated in an overall configuration view of FIG. 6, the ejector 13 according to the first embodiment is replaced with an ejector 53, and a branch part 15 that branches the refrigerant flow that has flowed out of an evaporator 14 is added.

The branch part 15 includes a three-way joint having three inlet/outlet ports. One of the three inlet/outlet ports is set as a refrigerant inlet port, whereas the remaining two inlet/outlet ports are set as refrigerant outlet ports. One refrigerant outlet port of the branch part 15 is connected with a refrigerant suction port 31b of the ejector 53, and the other refrigerant outlet port of the branch part 15 is connected with a second refrigerant suction port 31f provided in a housing body 31 of the ejector 53.

Figure 7:
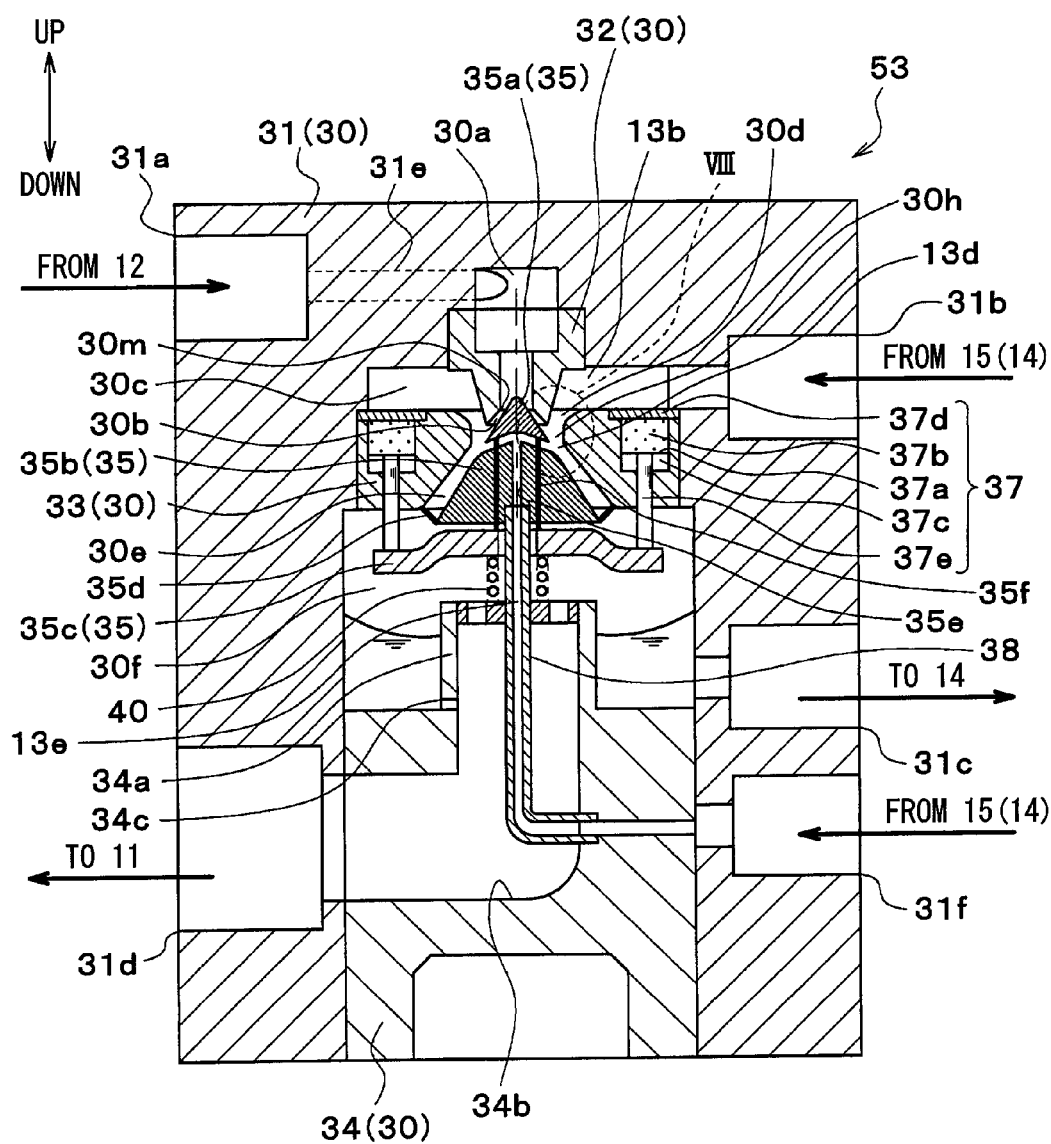
FIG. 7 is a sectional view parallel to an axial direction of an ejector according to the second embodiment.

As illustrated in FIG. 7, the ejector 53 according to this embodiment is added with a second suction passage 13e having the refrigerant outlet configured to be opened on the inner peripheral side of the refrigerant outlet of a nozzle passage 13a as compared with the ejector 13 of the first embodiment. In FIGS. 6 and 7, identical or equivalent parts to those in the first embodiment are denoted by the same symbols. The same is applied to the following drawings.

Further, in the following description, for the purpose of clarifying a difference between the suction passage 13b described in the first embodiment and the second suction passage 13e of this embodiment, the suction passage 13b is called "first suction passage 13b". For the purpose of clarifying a difference between the refrigerant suction port 31b described in the first embodiment and the second refrigerant suction port 31f of this embodiment, the refrigerant suction port 31b is called "first refrigerant suction port 31b".

Figure 8:
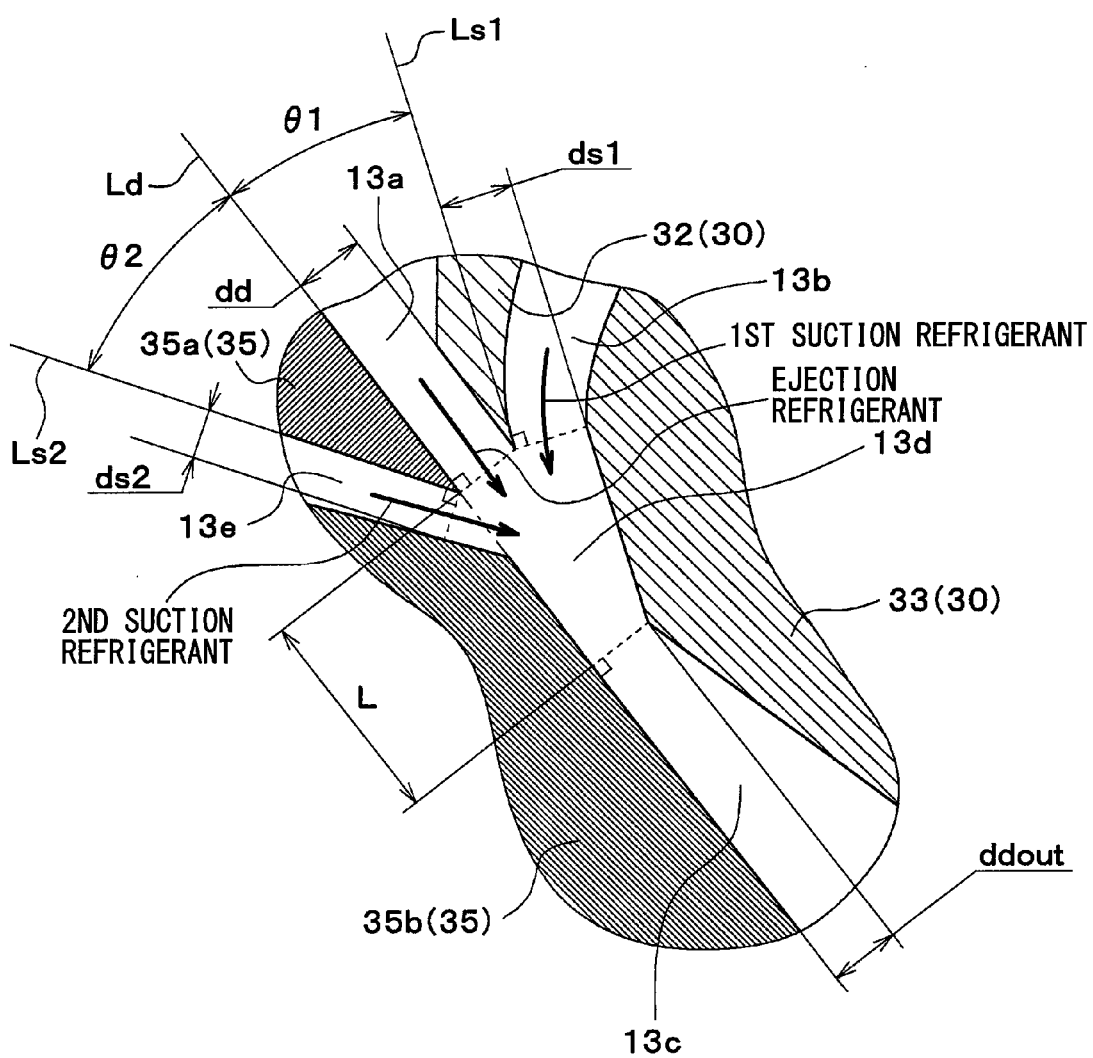
FIG. 8 is a diagram illustrating a portion VIII in FIG. 7.

A detailed configuration of the ejector 53 according to this embodiment will be described with reference to FIGS. 7 and 8. In the ejector 53 according to this embodiment, a passage formation member 35 is formed into a substantially truncated conical shape by the combination of three components.

In more detail, the passage formation member 35 according to this embodiment includes a tip nozzle formation portion 35a, an intermediate passage formation portion 35b, and a plate portion 35c. The tip nozzle formation portion 35a is disposed on an uppermost side and formed into a substantially truncated conical shape. The intermediate passage formation portion 35b is disposed on a lower side (downstream side in the refrigerant flow) of the tip nozzle formation portion 35a and formed into a substantially truncated conical shape. The plate portion 35c is disposed on a lower side (downstream side in the refrigerant flow) of the intermediate passage formation portion 35b and formed into a substantially disc shape.

The tip nozzle formation portion 35a is a component corresponding to the top side of the passage formation member 35 described in the first embodiment. In other words, the tip nozzle formation portion 35a is disposed in a depressurizing space 30b of a nozzle body 32, and the outer peripheral surface of the tip nozzle formation portion 35a defines the nozzle passage 13a.

The intermediate passage formation portion 35b is a component corresponding to the intermediate part and the lower side of the passage formation member 35 in the vertical direction described in the first embodiment. In other words, the intermediate passage formation portion 35b is disposed in a mixing space 30h and in a pressurizing space 30e of a middle body 33, and the outer peripheral surface of the intermediate passage formation portion 35b defines a mixing passage 13d and a diffuser passage 13c.

The intermediate passage formation portion 35b is fixed to a bottom surface side of the middle body 33 through multiple legs 35d in a state where a clearance is provided between a bottom surface of the tip nozzle formation portion 35a and an upper surface of the intermediate passage formation portion 35b. Therefore, the intermediate passage formation portion 35b is not displaced depending on a load variation of the ejector refrigeration cycle 50. The refrigerant passage in which the refrigerant flows is provided between the respective legs 35d.

A through-hole 35e extending along a center axis of the intermediate passage formation portion 35b is defined in the center of the intermediate passage formation portion 35b. An upper end side of the through-hole 35e communicates with the clearance provided between the bottom surface of the tip nozzle formation portion 35a and the upper surface of the intermediate passage formation portion 35b. On the other hand, a lower end side of the through-hole 35e is connected with an upper end of a suction pipe 38 in which the refrigerant drawn from the second refrigerant suction port 31f provided in the housing body 31 flows.

In other words, in this embodiment, the second suction passage 13e that draws the refrigerant from the external is defined by a suction refrigerant inflow passage that is formed in the housing body 31 and a lower body 34, and connects the second refrigerant suction port 31f to a lower end of the suction pipe 38, the suction pipe 38, the through-hole 35e of the intermediate passage formation portion 35b, and the clearance provided between the bottom surface of the tip nozzle formation portion 35a and the upper surface of the intermediate passage formation portion 35b. Further, a refrigerant outlet of the second suction passage 13e is opened in an annular shape on the inner peripheral side of the refrigerant outlet of the nozzle passage 13a.

The plate portion 35c is a component corresponding to a lowermost side (bottom) of the passage formation member 35 described in the first embodiment. In other words, the plate portion 35c is coupled with a lower end side of an actuating bar 37e of a driving device 37. The plate portion 35c is subjected to the load of a coil spring 40.

A through-hole through which the suction pipe 38 penetrates is defined in the center of the plate portion 35c. A diameter of the through-hole is set to be larger than an outer diameter of the suction pipe 38. The plate portion 35c is coupled with the tip nozzle formation portion 35a through multiple coupling bars 35f extending in a direction of the center axis. The coupling bars 35f are slidably disposed in through-holes formed in the intermediate passage formation portion 35b and extending in the direction of the center axis.

With the above configuration, when the plate portion 35c is displaced upon being subjected to the loads from the driving device 37 and the coil spring 40, the tip nozzle formation portion 35a coupled to the plate portion 35c through the coupling bars 35f is displaced together with the plate portion 35c.

Subsequently, detailed shapes of the mixing passage 13d, the first suction passage 13b, and the second suction passage 13e according to this embodiment will be described with reference to FIG. 8. The basic shape of the mixing passage 13d according to this embodiment is identical with that in the first embodiment. Therefore, the mixing passage 13d according to this embodiment is formed into a shape gradually reduced in the passage cross-sectional area toward the downstream side in the refrigerant flow.

Further, it is assumed that a passage cross-sectional area of the refrigerant outlet portion (refrigerant ejection port) of the nozzle passage 13a is φd, a passage cross-sectional area (opening area) of the refrigerant outlet portion of the first suction passage 13b is φs1, a passage cross-sectional area (opening area) of the refrigerant outlet portion of the second suction passage 13e is φs2, a passage cross-sectional area of the refrigerant outlet of the mixing passage 13d is φdout, a passage cross-sectional area of the refrigerant outlet portion of the nozzle passage 13a is φd, a passage cross-sectional area of the refrigerant outlet portion of the first suction passage 13b is φs1, a passage cross-sectional area of the refrigerant outlet portion of the second suction passage 13e is φs2, an equivalent diameter when converting a total value (φd+φs1+φs2) of the passage cross-sectional areas φd, φs1, and φs2 into a circle is D2, and a length of a site defining the mixing passage 13d in a length of the outer peripheral surface of the passage formation member 35 in the cross-section of the passage formation member 35 in the axial direction is L. In this case, the mixing passage 13d in this embodiment is defined in an area satisfying the following Formula F4, and the passage cross-sectional area φdout is set to satisfy the following Formula F5.

$$L/D2 \leq 1 \tag{F4}$$

$$\varphi dout \leq \varphi d + \varphi s1 + \varphi s2 \tag{F5}$$

The passage cross-sectional area φs1 can be defined as an area of the outer peripheral side surface formed into a truncated conical shape when rotating around the axis a line segment (distance ds1 in FIG. 8) extending from the outer peripheral surface of a tapered tip of the lower side of the nozzle body 32 in the normal direction, and reaching the downstream most portion of a site forming the suction passage 30d of the middle body 33 in the refrigerant flow, in the cross-section of the passage formation member 35 in the axial direction.

The passage cross-sectional area φs2 can be defined as an area of the outer peripheral side surface formed into a truncated conical shape when rotating around the axis a line segment (distance ds2 in FIG. 8) extending from the refrigerant flow downstream most portion of the bottom surface of the tip nozzle formation portion 35a of the passage formation member 35 in the normal direction, and reaching the upper surface of the intermediate passage formation portion 35b of the passage formation member 35, in the cross-section of the passage formation member 35 in the axial direction.

Further, in this embodiment, when it is assumed that a flow rate of the first suction refrigerant that has flowed out of the first suction passage 13b is Vs1, and the second suction refrigerant that has flowed out of the second suction passage 13e is Vs2, an area ratio ($\varphi s1/\varphi s2$) of the passage cross-sectional area $\varphi s1$ to the passage cross-sectional area $\varphi s2$ is determined to satisfy the following Formula F6.

$$Vs2 \leq Vs1 \tag{F6}$$

In other words, the area ratio ($\varphi s1/\varphi s2$) is determined so that the flow rate Vs1 of the first suction refrigerant becomes equal to or larger than the flow rate Vs2 of the second suction refrigerant.

Further, in this embodiment, in the cross-section of the passage formation member 35 in the axial direction, an intersection angle $\theta 1$ between a tangent line Ld on the most upstream portion of a site forming the mixing passage 13d in the outer peripheral surface (including a virtual outer peripheral surface formed in the clearance between the tip nozzle formation portion 35a and the intermediate passage formation portion 35b) of the passage formation member 35, and a tangent line Ls1 on the refrigerant flow downstream most portion of a site forming the suction passage 30d of the middle body 33 is set to satisfy the following Formula F7. An intersection angle $\theta 2$ between the tangent line Ld and a tangent line Ls2 on the most refrigerant flow downstream portion of the bottom surface of the tip nozzle formation portion 35a is set to satisfy the following Formula F8.

$$0 < \theta 1 \leq 60° \tag{F7}$$

$$0 < \theta 2 \leq 60° \tag{F8}$$

The intersection angle $\theta 1$ is an angle defined on a side where the nozzle passage 13a is interposed in an angle defined between the tangent line Ld and the tangent line Ls1 in the cross-section of the passage formation member 35 in the axial direction. The intersection angle $\theta 2$ is an angle defined on a side where the tip nozzle formation portion 35a is interposed in an angle defined between the tangent line Ld and the tangent line Ls2 in the cross-section of the passage formation member 35 in the axial direction. The other configurations of the ejector 53 are identical with those of the ejector 13 in the first embodiment.

Next, the operation of this embodiment having the above-mentioned configuration will be described. The basic operation of the ejector refrigeration cycle 50 according to this embodiment is identical with that of the ejector refrigeration cycle 10 in the first embodiment. Therefore, as in the first embodiment, the refrigerant discharged from a compressor 11 is cooled into a subcooled liquid-phase refrigerant by a heat radiator 12.

The refrigerant of the subcooled liquid-phase refrigerant flows into the ejector 53, and is isentropically depressurized by the nozzle passage 13a of the ejector 53, and ejected. The refrigerant that has flowed out of the first evaporator 14 is drawn through the first refrigerant suction port 31b (first suction passage 13b), and the refrigerant that has flowed out of a second evaporator 17 is drawn through the second refrigerant suction port 31f (second suction passage 13e), due to the suction action of the ejection refrigerant ejected from the nozzle passage 13a.

Further, the ejection refrigerant ejected from the nozzle passage 13a, the first suction refrigerant drawn from the first suction passage 13b, and the second suction refrigerant drawn from the second suction passage 13e are mixed together in the mixing passage 13d, and flow into the diffuser passage 13c. The subsequent operation is the same as that in the first embodiment.

Therefore, in the ejector refrigeration cycle 50 according to this embodiment, the cycle efficiency (COP) can be improved as in the first embodiment. Further, according to the ejector 53 of this embodiment, as in the first embodiment, the energy conversion efficiency (corresponding to the nozzle efficiency) in the nozzle passage 13a can be improved while the body size of the overall ejector 53 is restricted from being upsized.

Further, according to the ejector 53 of this embodiment, the refrigerant outlet of the first suction passage 13b is opened on the outer peripheral side of the refrigerant outlet of the nozzle passage 13a, and the refrigerant outlet of the second suction passage 13e is opened on the inner peripheral side of the refrigerant outlet of the nozzle passage 13a, with reference to the center axis of the passage formation member 35. Therefore, the first suction refrigerant merges into the ejection refrigerant from the outer peripheral side of the ejection refrigerant, and the second suction refrigerant merges into the ejection refrigerant from the inner peripheral side of the ejection refrigerant.

Therefore, a boundary surface between the refrigerant on the outer peripheral side in the ejection refrigerant and the first suction refrigerant, and a boundary surface between the refrigerant on the inner peripheral side in the ejection refrigerant and the second suction refrigerant are each a free interface, and the ejection refrigerant can be restricted from drifting to the outer peripheral side or the inner peripheral side.

Further, the first suction refrigerant flows toward the inner peripheral side from the outer peripheral side of the ejection refrigerant, and the second suction refrigerant flows toward the outer peripheral side from the inner peripheral side of the ejection refrigerant. As a result, the ejection refrigerant, the first suction refrigerant, and the second suction refrigerant can be sufficiently mixed together. Therefore, the velocity energy of the droplets in the ejection refrigerant can be effectively transmitted to the gas-phase refrigerant in the mixed refrigerants.

As a result, as in the ejector 13 according to the first embodiment, the kinetic energy of the mixed refrigerants, which is converted into a pressure energy in the diffuser passage 13c, can be restricted from being reduced, and a reduction in the pressure increase amount in the diffuser passage 13c can be limited. Therefore, a reduction in the ejector efficiency can be limited.

In the ejector 53 of this embodiment, since the mixing passage 13d is formed into a shape gradually reduced in the passage cross-sectional area toward the downstream side in the refrigerant flow, the ejection refrigerant, the first suction refrigerant, and the second suction refrigerant can be sufficiently mixed together as with the ejector 13 of the first embodiment. Therefore, the velocity energy of the droplets in the ejection refrigerant can be more effectively transmitted to the gas-phase refrigerant in the mixed refrigerants.

According to the present inventors' study, it is found that, in the ejector 53 according to this embodiment, even if the mixing passage 13d is formed into a shape constant in the passage cross-sectional area toward the downstream side in the refrigerant flow, a pressure on the outlet side of the mixing passage 13d can be sufficiently reduced, and the droplets in the ejection refrigerant, the gas-phase refrigerant in the ejection refrigerant, the first suction refrigerant, and the second suction refrigerant can be sufficiently mixed together in the mixing passage 13d.

Further, according to the present inventors' study, it is confirmed that the area in which the mixing passage 13d is defined and the passage cross-sectional area φdout are so determined as to satisfy the above Formulas F4 and F5, as a result of which the velocity energy of the droplets in the ejection refrigerant can be effectively transmitted to the gas-phase refrigerant in the mixed refrigerants.

In the ejector 53 of this embodiment, the area ratio (φs1/φs2) is determined to satisfy the above Formula F6. As a result, a velocity component of the first suction refrigerant flowing from the outer peripheral side toward the inner peripheral side can be set to be larger than a velocity component of the second suction refrigerant flowing from the inner peripheral side toward the outer peripheral side.

Therefore, even if the mixed refrigerants flowing in the mixing space 13d attempt to flow toward the outer peripheral side due to the action of a centrifugal force generated by the presence of a velocity component of the mixed refrigerants swirled in the same direction as that of the refrigerant swirled in a swirling space 30a, the mixed refrigerants can be restricted from flowing toward the outer peripheral side due to a velocity component flowing from the outer peripheral side of the first suction refrigerant toward the inner peripheral side.

In other words, the droplets (grains of the liquid-phase refrigerant) in the ejection refrigerant can be restricted from adhering to the inner peripheral surface of the site forming the mixing space 30h in the middle body 33 due to the action of the centrifugal force.

In the ejector 53 according to this embodiment, the passage formation member 35 includes the multiple members, and the driving device 37 displaces the tip nozzle formation portion 35a and the plate portion 35c. With the above configuration, a portion to be displaced by the driving device 37 can be downsized, and the load exerted on the portion to be displaced by the driving device 37 from the refrigerant also becomes smaller. Therefore, the overall ejector 53 can be downsized with a reduction in the size of the driving device 37 per se.

(Third Embodiment)

Figure 9:
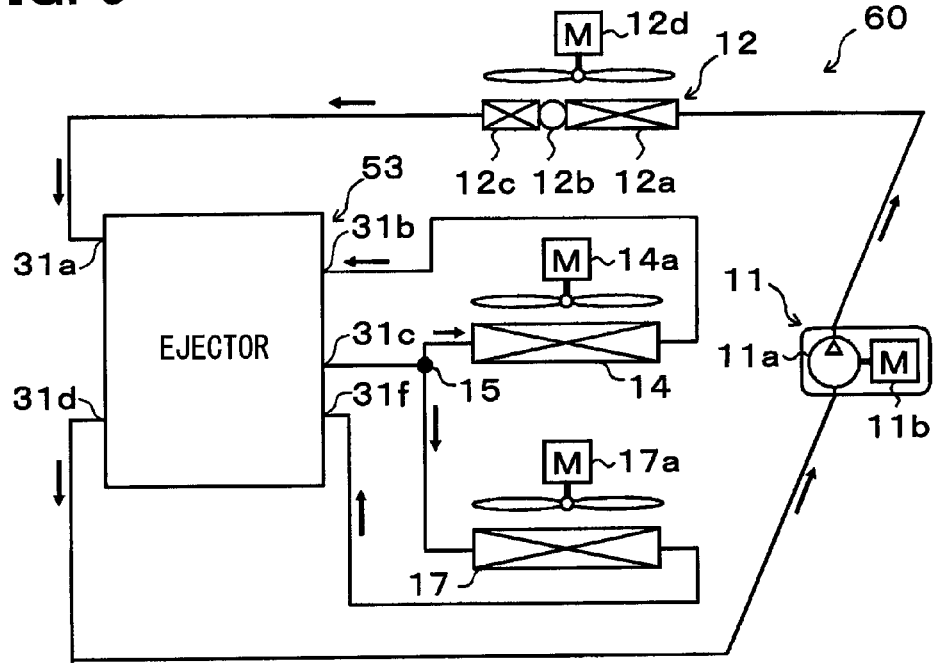
FIG. 9 is a schematic diagram of an ejector refrigeration cycle according to a third embodiment of the present disclosure.

Since the ejector 53 described in the second embodiment has two refrigerant suction ports of the first refrigerant suction port 31b and the second refrigerant suction port 31f, the ejector 53 can be applied to the ejector refrigeration cycle variously configured. Under the circumstances, in this embodiment, an ejector 53 is applied to an ejector refrigeration cycle 60 illustrated in FIG. 9. In the ejector refrigeration cycle 60, a branch part 15 is disposed in a liquid-phase refrigerant outlet port 31c of the ejector 53.

Further, one refrigerant outlet port of the branch part 15 is connected with a refrigerant inlet side of a first evaporator 14 (corresponding to the first evaporator 14 in the first embodiment), and a refrigerant outlet side of the first evaporator 14 is connected with a first refrigerant suction port 31b of the ejector 53. The other refrigerant outlet port of the branch part 15 is connected with a refrigerant inlet side of a second evaporator 17, and the refrigerant outlet side of the second evaporator 17 is connected with a second refrigerant suction port 31f of the ejector 53.

The basic configuration of the second evaporator 17 is the same as that of the first evaporator 14, and is a heat-absorbing heat exchanger that evaporates a low-pressure refrigerant depressurized by the ejector 53 and performs a heat absorbing effect by exchanging heat between the low-pressure refrigerant and a blast air that is blown into the vehicle interior from a blower fan 17a. The other configuration is identical with that in the second embodiment.

Therefore, when the ejector refrigeration cycle 60 of this embodiment is actuated, the liquid-phase refrigerant that has flowed out of the liquid-phase refrigerant outlet port 31c of the ejector 53 flows into the first evaporator 14 and the second evaporator 17 through the branch part 15.

The refrigerant flowing into the first evaporator 14 absorbs heat from the blast air blown by a blower fan 14a, and evaporates. With the above operation, the blast air blown by the blower fan 14a is cooled. The refrigerant that has flowed out of the first evaporator 14 is drawn from the first refrigerant suction port 31b of the ejector 53.

On the other hand, the refrigerant flowing into the second evaporator 17 absorbs heat from the blast air blown by the blower fan 17a, and evaporates. With the above operation, the blast air blown by the blower fan 17a is cooled. The refrigerant that has flowed out of the second evaporator 17 is drawn from the second refrigerant suction port 31f of the ejector 53.

As described above, according to the ejector refrigeration cycle 60 according to this embodiment, the blast air can be cooled by both of the first and second evaporators 14 and 17. Therefore, the ejector refrigeration cycle 60 according to this embodiment can be applied to a so-called dual air conditioning system that cools the blast air blown to a vehicle front seat side by one of the evaporators, and cools the blast air blown to a vehicle rear seat side by the other evaporator.

(Fourth Embodiment)

Figure 10:
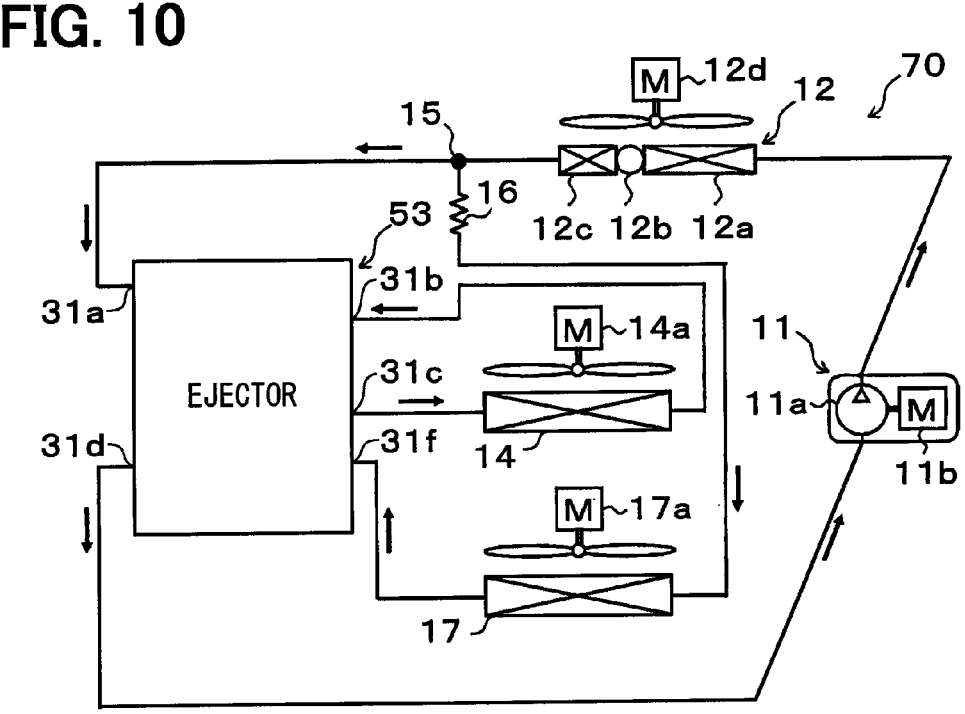
FIG. 10 is a schematic diagram of an ejector refrigeration cycle according to a fourth embodiment of the present disclosure.

In this embodiment, the ejector 53 described in the second embodiment is applied to an ejector refrigeration cycle 70 illustrated in FIG. 10. In the ejector refrigeration cycle 70, a branch part 15 is disposed on a refrigerant outlet side of a subcooling portion 12c of a heat radiator 12.

One refrigerant outlet port of the branch part 15 is connected with a refrigerant inlet side of a second evaporator 17 via a fixed throttle 16 which is a refrigerant depressurizing device. A refrigerant outlet side of the second evaporator 17 is connected with a second refrigerant suction port 31f of the ejector 53. The fixed throttle 16 can be exemplified by an orifice, a capillary tube, or a nozzle.

The other refrigerant outlet port of the branch part 15 is connected with a refrigerant inlet port 31a side of the ejector 53. A liquid-phase refrigerant outlet port 31c of the ejector 53 is connected with the refrigerant inlet side of a first evaporator 14, and the refrigerant outlet side of the first evaporator 14 is connected with a first refrigerant suction port 31b.

Figure 11:
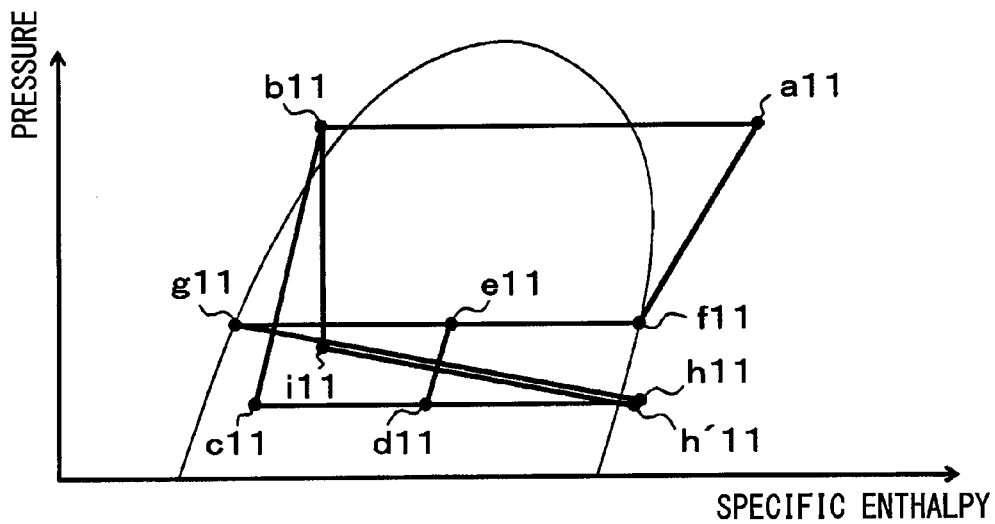
FIG. 11 is a Mollier diagram illustrating a state of a refrigerant in the ejector refrigeration cycle according to the fourth embodiment.

Therefore, when the ejector refrigeration cycle 70 according to this embodiment is actuated, a state of the refrigerant is changed as illustrated in a Mollier diagram of FIG. 11. Each symbol indicating the state of the refrigerant in the Mollier diagram of FIG. 11 is denoted by the same alphabet if the symbol represents the state of the refrigerant in the same place in the cycle configuration in the Mollier diagram of FIG. 5, and only subscript is changed. The same is applied to the following Mollier diagram.

In the ejector refrigeration cycle 70 of this embodiment, a flow of the subcooled liquid-phase refrigerant that has flowed out of the heat radiator 12 is branched in the branch part 15. One of the refrigerants that have been branched in the branch part 15 is depressurized by the fixed throttle 16 in an isentropic manner, and flows into the second evaporator 17 (point b11 to point i11 in FIG. 11).

The refrigerant flowing into the second evaporator 17 absorbs heat from the blast air blown by a blower fan 17a, and evaporates. With the above operation, the blast air blown by the blower fan 17a is cooled (point i11 to point h'11 in FIG. 11).

The other refrigerant branched in the branch part 15 is depressurized in a nozzle passage 13a of the ejector 53 in an isentropic manner, and ejected (point b11 to point c11 in FIG. 11). The refrigerant that has flowed out of the first evaporator 14 is drawn through the first refrigerant suction port 31b, and the refrigerant that has flowed out of the second evaporator 17 is drawn through the second refrigerant suction port 31f, due to the suction action of the ejection refrigerant ejected from the nozzle passage 13a.

Further, the ejection refrigerant ejected from the nozzle passage 13a, the first suction refrigerant drawn from a first suction passage 13b, and the second suction refrigerant drawn from a second suction passage 13e are mixed together in a mixing passage 13d, and flow into a diffuser passage 13c (point c11 to point d11, point h11 to point d11, and point h'11 to point d11, in FIG. 11). The subsequent operation is the same as that in the second embodiment.

Therefore, the refrigerant that has flowed out of the liquid-phase refrigerant outlet port 31c of the ejector 53 and flowing into the first evaporator 14 absorbs heat from the blast air blown by a blower fan 14a, and evaporates. With the above operation, the blast air blown by the blower fan 14a is cooled (point g11 to point h11 in FIG. 11).

As described above, according to the ejector refrigeration cycle 70 according to this embodiment, the blast air can be cooled by both of the first and second evaporators 14 and 17. Therefore, as with the ejector refrigeration cycle 60 in the third embodiment, the ejector refrigeration cycle 70 according to this embodiment can be applied to a dual air conditioning system.

(Fifth Embodiment)

Figure 12:
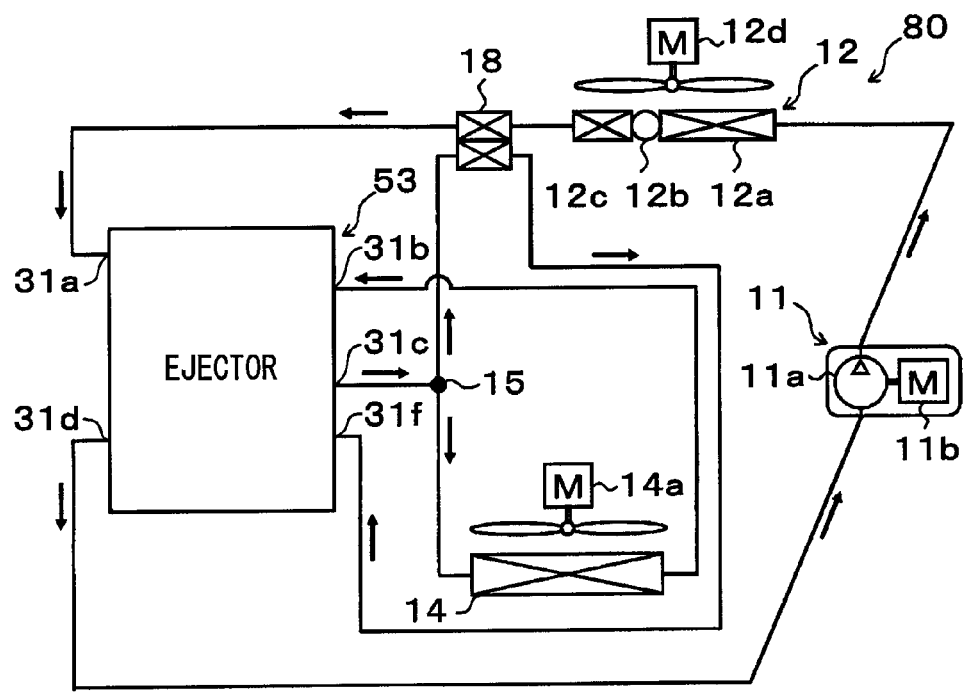
FIG. 12 is a schematic diagram of an ejector refrigeration cycle according to a fifth embodiment of the present disclosure.

In this embodiment, the ejector 53 described in the second embodiment is applied to an ejector refrigeration cycle 80 illustrated in FIG. 12. The ejector refrigeration cycle 80 includes an internal heat exchanger 18 that exchanges heat between a high-pressure refrigerant and a low-pressure refrigerant that have flowed out of a subcooling portion 12c of a heat radiator 12. Further, a branch part 15 is disposed in a liquid-phase refrigerant outlet port 31c of the ejector 53.

The internal heat exchanger 18 can be configured by a double-pipe heat exchanger in which an inside pipe defining a low-pressure side refrigerant passage in which a low-pressure refrigerant flows is disposed inside of an outside pipe defining a high-pressure side refrigerant passage in which a high-pressure refrigerant that has flowed out of the heat radiator 12 flows. An outlet side of the high-pressure side refrigerant passage of the internal heat exchanger is connected with a refrigerant inlet port 31a side of the ejector 53.

One refrigerant outlet port of the branch part 15 is connected with a refrigerant inlet side of an evaporator 14, and the refrigerant outlet side of the evaporator 14 is connected with a first refrigerant suction port 31b of the ejector 53. The other refrigerant outlet port of the branch part 15 is connected with the inlet side of the low-pressure side refrigerant passage of the internal heat exchanger 18, and the outlet side of the low-pressure side refrigerant passage of the internal heat exchanger 18 is connected with a second refrigerant suction port 31f of the ejector 53.

Figure 13:
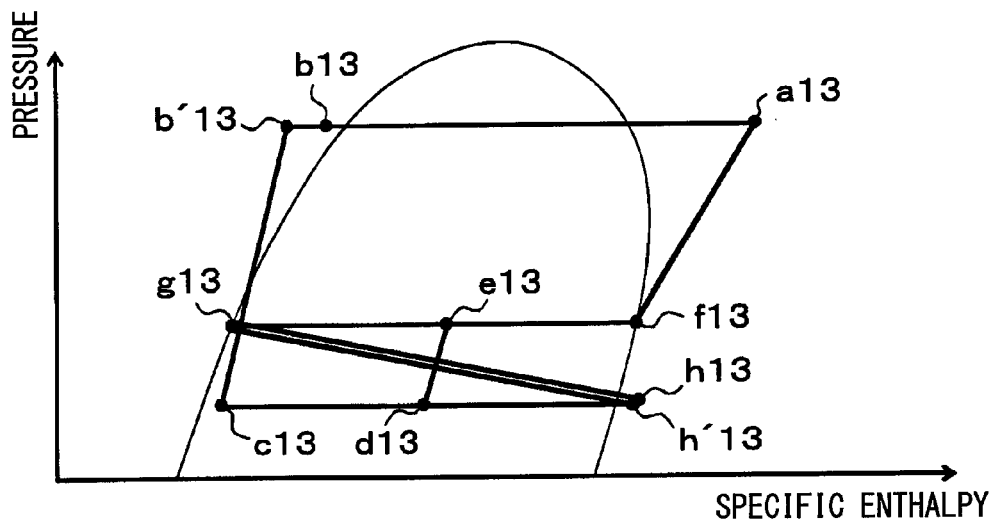
FIG. 13 is a Mollier diagram illustrating a state of a refrigerant in the ejector refrigeration cycle according to the fifth embodiment.

Therefore, when the ejector refrigeration cycle 80 according to this embodiment is actuated, a state of the refrigerant is changed as illustrated in a Mollier diagram of FIG. 13. In other words, in the ejector refrigeration cycle 80 according to this embodiment, the internal heat exchanger 18 exchanges heat between the high-pressure refrigerant (point b13 in FIG. 13) in the subcooled liquid phase state which flows out of the heat radiator 12 and the low pressure liquid-phase refrigerant (point g13 in FIG. 13) flowing out of the other refrigerant outlet port of the branch part 15.

As a result, an enthalpy of the high-pressure refrigerant in the subcooled liquid phase state which flows out of the heat radiator 12 is further reduced (point b13 to point b'13 in FIG. 13), and an enthalpy of the low pressure liquid-phase refrigerant that has flowed out of the other refrigerant outlet port of the branch part 15 increases (point g13 to point h'13 in FIG. 13).

The refrigerant that has flowed out of the high-pressure side refrigerant passage of the internal heat exchanger 18 is depressurized in a nozzle passage 13a of the ejector 53 in an isentropic manner, and ejected (point b13 to point c13 in FIG. 13). The refrigerant that has flowed out of the evaporator 14 is drawn through the first refrigerant suction port 31b, and the refrigerant that has flowed out of the low-pressure side refrigerant passage of the internal heat exchanger 18 is drawn through the second refrigerant suction port 31f, due to the suction action of the ejection refrigerant ejected from the nozzle passage 13a.

Further, the ejection refrigerant ejected from the nozzle passage 13a, the first suction refrigerant drawn from a first suction passage 13b, and the second suction refrigerant drawn from a second suction passage 13e are mixed together in a mixing passage 13d, and flow into a diffuser passage 13c (point c13 to point d13, point h13 to point d13, and point h'13 to point d13, in FIG. 13). The subsequent operation is the same as that in the second embodiment.

Therefore, the refrigerant that has flowed out of the liquid-phase refrigerant outlet port 31c of the ejector 53 and flowing into the evaporator 14 absorbs heat from the blast air blown by a blower fan 14a, and evaporates. With the above operation, the blast air blown by the blower fan 14a is cooled (point g13 to point h13 in FIG. 13).

As described above, according to the ejector refrigeration cycle 80 of this embodiment, the enthalpy of the refrigerant flowing into the refrigerant inlet port 31a of the ejector 53 can be reduced by the internal heat exchanger 18. Therefore, an enthalpy difference between the enthalpy of the outlet side refrigerant and the enthalpy of the inlet side refrigerant in the evaporator 14 increases so that a refrigerating capacity to be exhibited by the evaporator 14 can increase.

(Sixth Embodiment)

Figure 14:
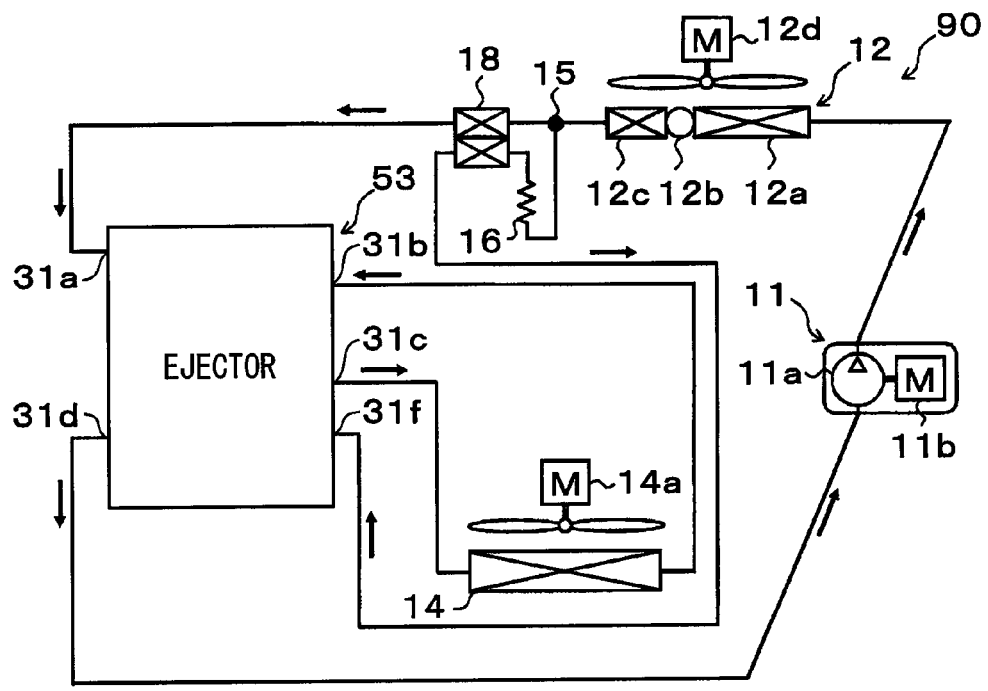
FIG. 14 is a schematic diagram of an ejector refrigeration cycle according to a sixth embodiment of the present disclosure.

In this embodiment, the ejector 53 described in the second embodiment is applied to an ejector refrigeration cycle 90 illustrated in FIG. 14. The ejector refrigeration cycle 90 includes an internal heat exchanger 18 as in the fifth embodiment. A branch part 15 is disposed in a refrigerant outlet side of a subcooling portion 12c in a heat radiator 12.

Further, one refrigerant outlet port of the branch part 15 is connected with the inlet side of the low-pressure side refrigerant passage of the internal heat exchanger 18 through a fixed throttle 16, and the outlet side of the low-pressure side refrigerant passage of the internal heat exchanger 18 is connected with a second refrigerant suction port 31f of the ejector 53.

The other refrigerant outlet port of the branch part 15 is connected with a refrigerant inlet port 31a side of the ejector 53. A liquid-phase refrigerant outlet port 31c of the ejector 53 is connected with the refrigerant inlet side of an evaporator 14, and the refrigerant outlet side of the evaporator 14 is connected with a first refrigerant suction port 31b.

Figure 15:
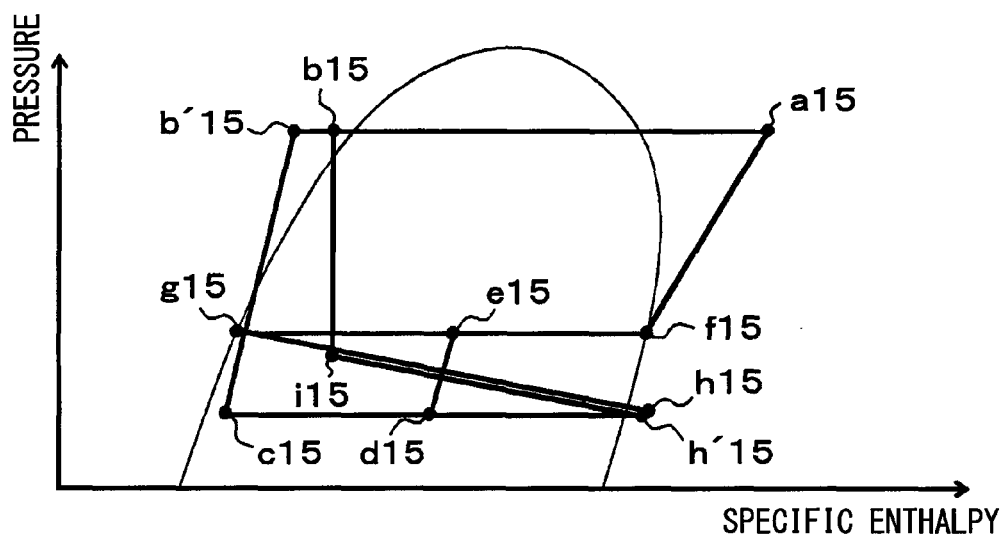
FIG. 15 is a Mollier diagram illustrating a state of a refrigerant in the ejector refrigeration cycle according to the sixth embodiment.

Therefore, when the ejector refrigeration cycle 90 according to this embodiment is actuated, a state of the refrigerant is changed as illustrated in a Mollier diagram of FIG. 15. In other words, in the ejector refrigeration cycle 90 according to this embodiment, the internal heat exchanger 18 exchanges heat between the high-pressure refrigerant (point b15 in FIG. 15) in the subcooled liquid phase state which flows out of the heat radiator 12 and the low-pressure refrigerant (point i15 in FIG. 15) flowing out of one refrigerant outlet port of the branch part 15, and depressurized by the fixed throttle 16.

As a result, an enthalpy of the high-pressure refrigerant in the subcooled liquid phase state which flows out of the heat radiator 12 is further reduced (point b15 to point b'15 in FIG. 15), and an enthalpy of the low-pressure refrigerant that has flowed out of one refrigerant outlet port of the branch part 15 and depressurized by the fixed throttle 16 increases (point g15 to point h'15 in FIG. 15).

The refrigerant that has flowed out of the high-pressure side refrigerant passage of the internal heat exchanger 18 is depressurized in a nozzle passage 13a of the ejector 53 in an isentropic manner, and ejected (point b15 to point c15 in FIG. 15). The subsequent operation is the same as that in the fifth embodiment.

Therefore, the refrigerant that has flowed out of the liquid-phase refrigerant outlet port 31c of the ejector 53 and flowing into the evaporator 14 absorbs heat from the blast air blown by a blower fan 14a, and evaporates. With the above operation, the blast air blown by the blower fan 14a is cooled (point g15 to point h15 in FIG. 15).

As described above, according to the ejector refrigeration cycle 90 of this embodiment, the enthalpy of the refrigerant flowing into the refrigerant inlet port 31a of the ejector 53 can be reduced by the internal heat exchanger 18. Therefore, as with the ejector refrigeration cycle 80 in the fifth embodiment, the ejector refrigeration cycle 90 according to this embodiment can increase the refrigerating capacity exhibited by the evaporator 14.

(Seventh Embodiment)

Figure 16:
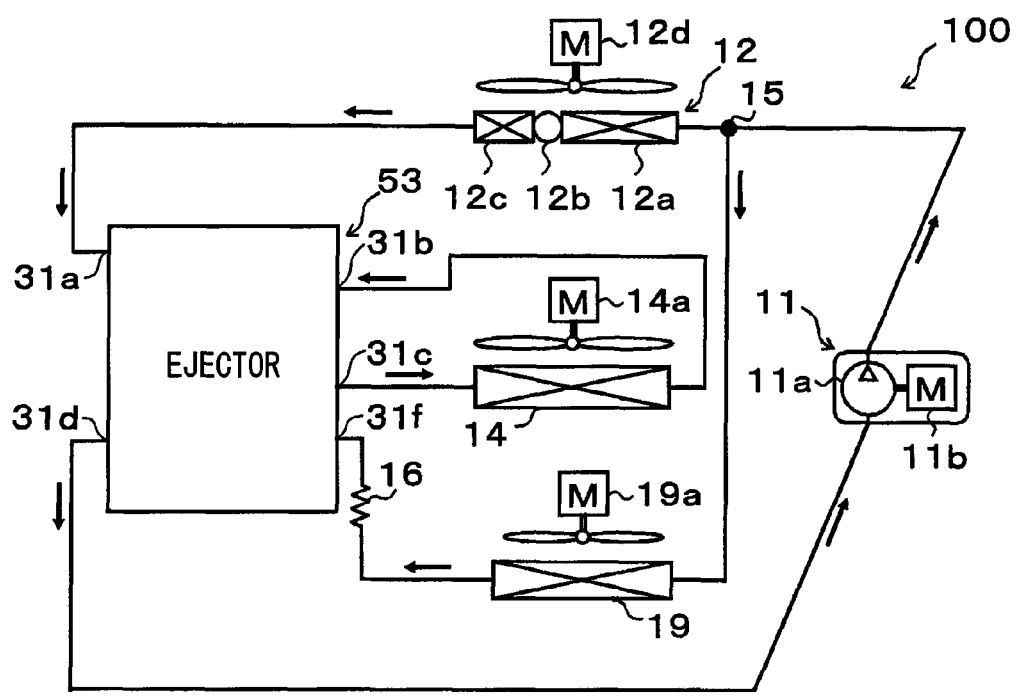
FIG. 16 is a schematic diagram of an ejector refrigeration cycle according to a seventh embodiment of the present disclosure.

In this embodiment, the ejector 53 described in the second embodiment is applied to an ejector refrigeration cycle 100 illustrated in FIG. 16. In the ejector refrigeration cycle 100, a branch part 15 is disposed on an upstream side (refrigerant discharge port side of a compressor 11) of a heat radiator 12.

Further, one refrigerant outlet port of the branch part 15 is connected with a second refrigerant suction port 31f of the ejector 53 through a heater 19 and a fixed throttle 16. The other refrigerant outlet port of the branch part 15 is connected with the refrigerant inlet side of the heat radiator 12. A liquid-phase refrigerant outlet port 31c of the ejector 53 is connected with the refrigerant inlet side of an evaporator 14, and the refrigerant outlet side of the evaporator 14 is connected with a first refrigerant suction port 31b.

The heater 19 is a heating heat exchanger that exchanges heat between a high-temperature high-pressure refrigerant discharged from the compressor 11 and a blast air blown into the vehicle interior to radiate the heat of the high-temperature high-pressure refrigerant to the blast air, and heats the blast air.

Accordingly, when the ejector-type refrigeration cycle 100 of this embodiment is actuated, a flow of the high-temperature high-pressure refrigerant discharged from the compressor 11 is branched in the branch part 15. The refrigerant that has flowed out of one refrigerant outlet port of the branch part 15 flows into the heater 19, and radiates heat to the blast air blown by a blower fan 19a.

With the above operation, the blast air blown by the blower fan 19a is heated. The refrigerant that has flowed out of the heater 19 is depressurized to the low-pressure refrigerant by the fixed throttle 16, and drawn from the second refrigerant suction port 31f of the ejector 53. The refrigerant that has flowed out of the other refrigerant outlet port of the branch part 15 flows into the heat radiator 12. The subsequent operation is the same as that in the third embodiment.

Therefore, the refrigerant that has flowed out of the liquid-phase refrigerant outlet port 31c of the ejector 53 and flowing into the evaporator 14 absorbs heat from the blast air blown by a blower fan 14a, and evaporates. With the above operation, the blast air blown by the blower fan 14a is cooled.

As described above, according to the ejector refrigeration cycle 100 according to this embodiment, the blast air can be cooled by the evaporator 14, and the blast air can be heated by the heater 19. Therefore, with the configuration in which the blower fan 19a is eliminated, and after the blast air blown from the blower fan 14a is cooled by the evaporator 14, the air is again heated by the heater 19, a space to be air-conditioned can be dehumidified and heated.

The present disclosure is not limited to the above-described embodiments, but various modifications can be made thereto as follows without departing from the spirit of the present disclosure.

In the above-mentioned embodiment, the ejectors 13 and 53 in which the ejection refrigerant and the suction refrigerant flowing into the mixing passage 13d have the velocity component swirling in the same direction as that of the refrigerant swirling in the swirling space 30a have been described. The mixture improving effect of the ejection refrigerant and the suction refrigerant by the mixing passage 13d can be obtained even if the ejection refrigerant and the suction refrigerant do not have the velocity component in the swirling direction. Therefore, the swirling space 30a of the ejectors 13 and 53 may be eliminated.

In the above embodiment, an example in which an area of an outer peripheral side surface formed into a truncated conical shape formed when rotating around the axis a line segment extending from the outer peripheral surface of the passage formation member 35 in the normal direction, and reaching the inner peripheral surface of the mixing space 30h of the middle body 33 is employed as the passage cross-sectional area of the mixing passage 13d has been described. However, the definition of the passage cross-sectional area is not limited to this example.

For example, a passage area in a cross-section perpendicular to a main flowing direction of the refrigerant flowing in the mixing passage 13d may be employed as the passage cross-sectional area of the mixing passage 13d. The same is applied to the other passage cross-sectional areas.

In the above embodiment, the intersection angle defined between the tangent line Ld on the most upstream portion of a site forming the mixing passage 13d in the outer peripheral surface of the passage formation member 35, and the tangent line Ls on the refrigerant flow downstream most portion of a site forming the suction passage 30d of the middle body 33 is employed as the intersection angle θ. However, the definition of the intersection angle θ is not limited to this configuration.

For example, an angle defined between the main flowing direction of the ejection refrigerant flowing into the mixing passage 13d and the main flowing direction of the suction refrigerant flowing into the mixing passage 13d may be employed as the intersection angle θ. The same is applied to the intersection angles θ1 and θ2.

In the above embodiments, the description has been given of the example in which the driving device 37 that displaces the passage formation member 35 includes the sealed space 37b in which the temperature sensitive medium having the pressure changed according to a change in the temperature is sealed, and the diaphragm 37a that is displaced according to the pressure of the temperature sensitive medium within the sealed space 37b. However, the driving device is not limited to this configuration.

For example, a thermowax having a volume changed according to the temperature may be employed as the temperature sensitive medium, or a configuration having an elastic member of a shape memory alloy may be used as the driving device. Further, a configuration in which the passage formation member 35 may be displaced by an electric mechanism such as an electric motor or a solenoid may be employed as the driving device.

In the above embodiments, the details of the liquid-phase refrigerant outlet port 31c of the ejector 13 are not described. A depressurizing device (for example, side fixed aperture including an orifice or a capillary tube) for depressurizing the refrigerant may be arranged on the liquid-phase refrigerant outlet port 31c.

In the above embodiments, the example in which the ejector refrigeration cycles 10 and 50 including the ejectors 13 and 53 of the present disclosure, respectively, are applied to a vehicle air conditioning apparatus has been described, but the application of the ejector refrigeration cycles 10 and 50 having the ejectors 13 and 53 of the present disclosure, respectively, is not limited to this configuration. For example, the ejector refrigeration cycle 10 may be applied to, for example, a stationary air conditioning apparatus, a cold storage warehouse, cooling heating device for a vending machine, etc.

Examples in which a subcooling heat exchanger is employed as the heat radiator 12 have been described in the above-mentioned embodiments, but, needless to say, a normal heat radiator formed of only the condenser 12a may be employed as the heat radiator 12. In the above-described embodiments, the example in which constituent members such as the body 30 of the ejectors 13 and 53 or the passage formation member 35 are formed of metal is described. However, as long as functions of constituent members can be exerted, the materials are not limited. Accordingly, those components may be made of a resin.

The invention claimed is:

1. An ejector for a vapor compression refrigeration cycle device, comprising:
a body including a depressurizing space in which a refrigerant is depressurized, and a first suction passage that communicates with a downstream side of the depressurizing space in a refrigerant flow and draws a refrigerant from an external to the ejector; and
a passage formation member which is arranged at least in the depressurizing space, has a conical shape increasing in cross-sectional area with distance from the depressurizing space, and includes a second suction passage that communicates with the downstream side of the depressurizing space in the refrigerant flow and draws a refrigerant from the external, wherein
the body further includes a pressurizing space into which a mixed refrigerant of an ejection refrigerant ejected from the depressurizing space, a first suction refrigerant drawn through the first suction passage and a second suction refrigerant drawn through the second suction passage are mixed together flow,
the depressurizing space has a nozzle passage, which functions as a nozzle that depressurizes and ejects the refrigerant, between an inner peripheral surface of the body and an outer peripheral surface of the passage formation member,
the pressurizing space has a diffuser passage, which functions as a diffuser that converts a kinetic energy of the mixed refrigerant into a pressure energy, between the inner peripheral surface of the body and the outer peripheral surface of the passage formation member,
a refrigerant outlet of the first suction passage is opened on an outer peripheral side of a refrigerant outlet of the nozzle passage, and
a refrigerant outlet of the second suction passage is opened on an inner peripheral side of the refrigerant outlet of the nozzle passage.

2. The ejector according to claim 1, wherein
the body has a mixing space in which the ejection refrigerant, the first suction refrigerant, and the second suction refrigerant are merged,
the mixing space has a mixing passage, in which the ejection refrigerant, the first suction refrigerant, and the second suction refrigerant are mixed together, between the inner peripheral surface of the body and the outer peripheral surface of the passage formation member, and
the mixing passage has a shape that is constant or gradually reduces in cross-sectional area toward a downstream side in the refrigerant flow.

3. The ejector according to claim 1, wherein
the body has a swirling space in which a refrigerant flowing from a refrigerant inlet port swirls, and the refrigerant on a swirling center side flows out to the depressurizing space, and
a flow rate of the refrigerant flowing out of the first suction passage is defined as Vs1, and a flow rate of the refrigerant flowing out of the second suction passage is defined as Vs2,
a ratio of an opening area of the refrigerant outlet of the first suction passage to an opening area of the refrigerant outlet of the second suction passage is determined to satisfy $Vs2 \leq Vs1$.

* * * * *